United States Patent [19]
Schmidt et al.

[11] Patent Number: 6,129,958
[45] Date of Patent: Oct. 10, 2000

[54] CHIRAL SMECTIC LIQUID CRYSTAL MIXTURE CONTAINING 1,2-DIFLUORONAPHTHALENES

[75] Inventors: Wolfgang Schmidt, Köln; Javier Manero, Liederbach; Barbara Hornung, Hasselroth, all of Germany

[73] Assignee: Hoechst Reasearch & Technology Deutschland GmbH & Co. KG, Frankfurt, Germany

[21] Appl. No.: 09/179,342

[22] Filed: Oct. 26, 1998

[30] Foreign Application Priority Data

Oct. 28, 1997 [EP] European Pat. Off. ............. 97118669

[51] Int. Cl.[7] ............................ C09K 19/42; C09K 19/32
[52] U.S. Cl. ................. 428/1.1; 252/299.01; 252/299.61; 252/299.62
[58] Field of Search .......................... 252/299.62, 299.01, 252/299.61; 428/1.1

[56] References Cited

U.S. PATENT DOCUMENTS

| 5,075,032 | 12/1991 | Hopf et al. | 252/299.63 |
|---|---|---|---|
| 5,209,866 | 5/1993 | Reffenrath et al. | 252/299.61 |
| 5,389,291 | 2/1995 | Reiffenrath et al. | 252/299.61 |
| 5,447,656 | 9/1995 | Jungbauer et al. | 252/299.01 |
| 5,460,749 | 10/1995 | Terada et al. | 252/299.61 |
| 5,478,496 | 12/1995 | Gray et al. | 252/299.61 |
| 5,512,209 | 4/1996 | Takiguchi et al. | 252/299.61 |
| 5,648,021 | 7/1997 | Wingen et al. | 252/299.62 |

FOREIGN PATENT DOCUMENTS

| 19522145 | 12/1995 | Germany . |
|---|---|---|
| 19522152 | 12/1995 | Germany . |
| 19522167 | 12/1995 | Germany . |
| 19522175 | 12/1995 | Germany . |
| 19522195 | 12/1995 | Germany . |

*Primary Examiner*—Shean C. Wu
*Attorney, Agent, or Firm*—Frommer Lawrence & Haug LLP

[57] ABSTRACT

A chiral smectic liquid crystal mixture, especially useful for operation in the $\tau V_{min}$-mode, comprises a substituted 1,2-difluornaphthaline derivatives of the formula (I), $$R^1(-A^1-M^1)_a(-A^2-M^2)_b-B-(M^3-A^3-)_c(M^4-A^4-)_dR^2 \quad (I)$$

wherein the symbols and indices have the following meanings:

B is

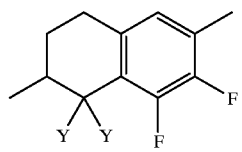

or

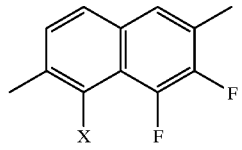

X is H or F;
Y is H, F or together O, and
$R^1(-A^1-M^1)_a(-A^2-M^2)_b-$, $(M^3-A^3-)_c(M^4-A^4-)_dR^2$ are mesogenic groups.

8 Claims, No Drawings

CHIRAL SMECTIC LIQUID CRYSTAL MIXTURE CONTAINING 1,2-DIFLUORONAPHTHALENES

The present invention relates to a chiral smectic liquid crystal mixture. More particularly, it relates to a chiral non-racemic tilted smectic (hereinafter called ferroelectric) liquid crystal mixture, in particular one that shows a high switching speed when driven at a low voltage, and a liquid crystal display device with the use of this liquid crystal mixture.

Since Clark and Lagerwall found Surface Stabilized Ferroelectric Liquid Crystals (SSFLC) in 1980 [N. A. Clark and S. T. Lagerwall, Appl. Phys. Lett., 36, 899 (1980)], these liquid crystals have attracted attentions as display materials in the coming generation and a number of studies have been carried out thereon. The reasons therefore are as follows. (1) These ferroelectric liquid crystals (FLC) have a high response speed. (2) They have memory properties which enable a display of a large information capacity and they can be produced at a relatively low cost, since no active device (thin film transistor, etc.) is needed. (3) They have a broad viewing angle. Thus, these liquid crystals are expected to be usable in a display device having a large screen size and a large display capacity.

To use a ferroelectric liquid crystal (FLC) display device in practice, it is an important factor to achieve a highly defined contrast. It is very difficult to establish a highly defined contrast at the desired level by using ferroelectric liquid crystals. The reasons therefore reside in, for example, the zigzag defect in the smectic C phase, a decrease in the effective cone angle due to the chevron geometry, the insufficient memory properties, etc. There have been proposed various methods for achieving a highly defined contrast. Examples of these methods include the use of an oblique vapor-deposition film as an alignment layer, the C1 uniform method by using an alignment layer having a high pretilt, the utilization of a quasi-bookshelf geometry through an AC electric field processing or by using a naphthalene-based compound, and the use of a material having a negative dielectric anisotropy. Among the afore-mentioned methods, the one with the use of a material having a negative dielectric anisotropy ($\Delta\epsilon$) depends on a phenomenon that, when an electric field of a high frequency is applied perpendicularly to the electrode substrate, liquid crystal molecules having a negative $\Delta\epsilon$ are aligned in parallel with the electrode substrate. This phenomenon is called the AC stabilization effect.

Multiplexed FLC devices can operate in two different ways: the so-called "normal mode" and the so-called "inverse mode", the latter also sometimes being referred to as "$\tau V_{min}$-mode" or "negative dielectric mode". The distinction of both modes lies in the addressing schemes and in the different requirement with respect to the dielectric tensor of the FLC material, i.e. the FLC mixture. Surveys are given, for example, in "Fast High Contrast Ferroelectric Liquid Crystal Displays and the Role of Dielectric Biaxiality" by J. C. Jones, M. J. Towler, J. R. Hughes, Displays, Volume 14, No.2 (1993) 86–93 (referred to as Jones hereafter); M. Koden, Ferroelectrics 179, 121 (1996) and references cited therein.

In general, the switching characteristics of FLC can be discussed in terms of a diagram having the driving voltage (V) on the horizontal axis and the driving pulse width ($\tau$, time) on the vertical axis as in Jones, FIGS. 4, 8, 10 or 11.

A switching curve is determined experimentally and divides the V,$\tau$ area into a switching and non-switching part. Usually, the higher the voltage, the smaller is the pulse width for switching. Such a behaviour is typically observed for the so-called "normal mode" FLC devices within the range of applied driving voltages.

For a suitable material, however, the V,$\tau$ curve reaches a minimum (at voltage $V_{min}$) as—for example—shown in Jones, FIGS. 8, 10, 11 and then shows an upturn for higher voltages which is due to the superposition of dielectric and ferroelectric torques. FLC devices work in the inverse mode, if in the temperature range of operation, the sum of row and column driving voltage is higher than the voltage at the minimum of the V,$\tau$ curve, i.e. $V_{row}+V_{col}>V_{min}$. Otherwise, they work in the so-called normal mode.

Examples of this driving mode are given in P. W. H. Surguy et al., Ferroelectrics 1991, 122, 63 (referred to as Surguy hereafter) and P. W. Ross, Proc. SID, 1992, 217.

Surguy reported a driving system in which switching is effected under the voltage $|V_s-V_d|$ but not under $|V_s+V_d|$ or $|V_d|$.

($V_s$: strobe pulse; $V_d$: data pulse)

The driving voltage in this system is determined by ($\tau$-$V_{min}$) characteristics for the materials. According to Surguy, the value $V_{min}$ is defined as follows;

$$V_{min} = E_{min} * d = \frac{P_s * d}{\sqrt{3 * \varepsilon_0 * \Delta\varepsilon * \sin^2\Theta}}$$

In the above formula, $E_{min}$ stands for the minimum strength of the electric field; d stands for the cell gap, $P_s$ stands for the spontaneous polarization; $\Delta\epsilon$ stands for the dielectric anisotropy; and $\Theta$ stands for the tilt angle of the liquid crystal material.

By taking the biaxial anisotropy ($\delta\epsilon$) into consideration, furthermore, M. J. Towler et al. (Liquid Crystals 1992, Bd. 11) obtained the values $V_{min}$ and $\tau_{min}$ as defined below.

$$|V_{min}| = \frac{P_s * d}{\varepsilon_0 * \sqrt{3 * (\sin^2\Theta - \delta\varepsilon)}}$$

$$\tau_{min} \sim \frac{\eta * (\Delta\varepsilon * \sin^2\Theta - \delta\varepsilon)}{P_s^2}$$

($\eta$: viscosity)

However, the ferroelectric liquid crystal material disclosed by Ross et al. still shows only a slow response speed and $[V_s+V_d]$ exceeds 55 V, which makes it less usable in practice.

Further ferroelectric liquid crystal mixtures appropriate for driving systems with the use of the AC stabilization effect or driving systems with the use of the $\tau$-$V_{min}$ characteristics are disclosed, e.g. in EP-A 0 322 793, EP-A 0 345 091, EP-A 0 453 309, EP-A 0 210 215, WO-A 89/02425 and WO-A 89/08690.

However, since the development of ferroelectric liquid crystal mixtures can in no way be regarded as complete, the manufactures of displays are still interested in a very wide variety of mixtures. Another reason for this is that only the interaction of the liquid crystal mixtures with the individual components of the display device or of the cells (for example the alignment layer) allows conclusions to be drawn on the quality of the liquid crystal mixtures too.

The object of the present invention was therefore to provide ferroelectric liquid crystal mixtures which are suitable for improving the property profile of ferroelectric liquid crystal displays, particularly of ferroelectric liquid crystal (FLC) displays operated in the inverse mode (using the ($\tau$-$V_{min}$) characteristics).

The present invention provides a chiral non-racemic tilted smectic liquid crystal mixture comprising a compound of group A:

A. substituted 1,2-difluornaphthaline derivatives of the formula (I),

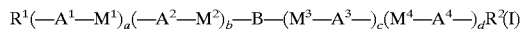

wherein the symbols and indices have the following meanings:

B is

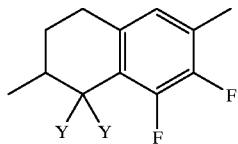

or

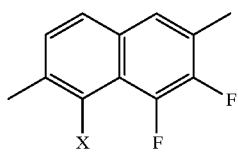

$R^1$ and $R^2$, independently of one another, are
(a) a hydrogen atom, —F, —Cl, —CN, —$CF_3$ or —$OCF_3$,
(b) a straight-chain or branched-chain alkyl group, with or without asymmetric carbon atoms, having from 1 to 20 carbon atoms, in which
b1) one or more non-adjacent and non-terminal —$CH_2$— groups may be replaced by —O—, —S—, —CO—, —CO—O—, —O—CO—, —O—CO—O— or —Si($CH_3$)$_2$— and/or
b2) one or more —$CH_2$— groups may be replaced by —CH=CH—, —C≡C—, 1,4-cyclohexylene, 1,4-phenylene, cyclopropane-1,2-diyl or 1,3-cyclopentylene and/or
b3) one or more hydrogen atoms of the alkyl group may be substituted by F and/or Cl and/or
b4) the terminal $CH_3$-group may be replaced by any one of the following chiral groups (optically active or racemic):

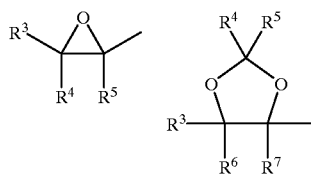
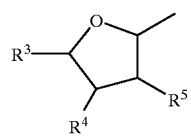

-continued

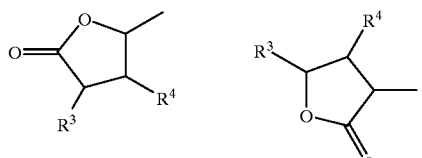

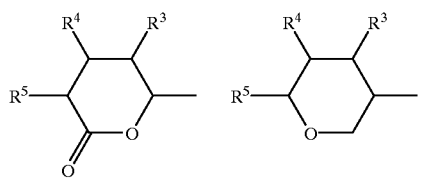

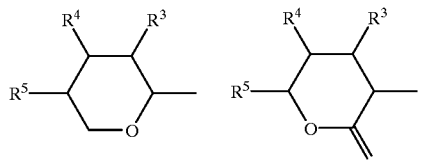

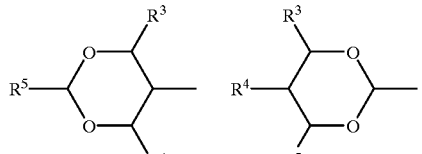

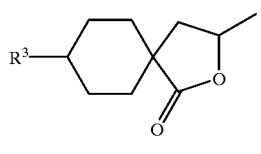

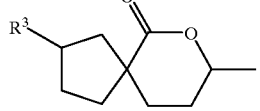

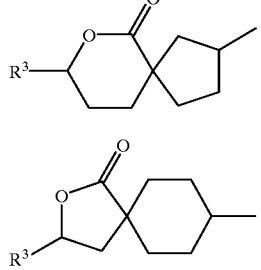

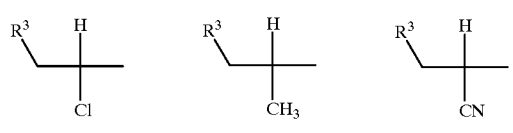

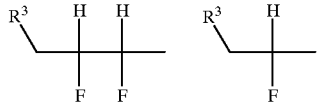

with the proviso that only one of $R^1$, $R^2$ can be a hydrogen atom, —F, —Cl, —CN, —$CF_3$ or —$OCF_3$;

$R^3$, $R^4$, $R^5$, $R^6$, $R^7$, independently of one another, are
  a) a hydrogen atom,
  b) a straight-chain or branched-chain alkyl group (with or without asymmetric carbon atoms) having from 1 to 16 carbon atoms, where
    b1) one or more non-adjacent and non-terminal —CH$_2$— groups may be replaced by —O— and/or
    b2) one or two —CH$_2$— groups may be replaced by —CH=CH— and/or
    b3) one or more hydrogen atoms of the alkyl group may be substituted by F or Cl,
  c) $R^4$ and $R^5$ may also together be —(CH$_2$)$_4$— or —(CH$_2$)$_5$— if they are bonded to an oxirane, dioxolane, tetrahydrofuran, tetrahydropyrane, butyrolactone or valerolactone system;

$M^1$, $M^2$, $M^3$, $M^4$, independently of one another, are
  —CO—O—, —O—CO—, —CH$_2$—O—, —O—CH$_2$—, —CH$_2$—CH$_2$—, —CH=CH—, —C≡C—, —CH$_2$—CH$_2$—CO—O—, —O—CO—CH$_2$—CH$_2$— or a single bond;

$A^1$, $A^2$, $A^3$, $A^4$, independently of one another, are
  1,4-phenylene, in which one or more H atoms may be replaced by F, Cl and/or CN, pyridine-2,5-diyl, in which one H atom may be replaced by F, pyrimidine-2,5-diyl, pyrazine-2,5-diyl, in which one H atom may be replaced by F, pyridazin-3,6-diyl, in which one H atom may be replaced by F, 1,4-cyclohexylene, in which one or two hydrogen atoms may be substituted by CN and/or F and/or CH$_3$, thiophene-2,5-diyl, in which one or two H atoms may be replaced by F, [1,3,4]-thiadiazole-2,5-diyl, [1,3]-thiazole-2,4-diyl, in which one H atom may be replaced by F, [1,3]-thiazole-2,5-diyl, in which one H atom may be replaced by F, or 1,3-dioxane-2,5-diyl;

X is H or F and Y are both H, F or together O;
a, b, c, d are 0 or 1 with the proviso, that compounds of the formula (I) may not contain more than four five- or six-membered ring systems;

and a further compound of any of the groups B to G:
B. phenanthrene derivatives of the formula (II)

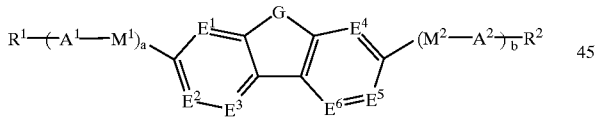

(II)

in which the symbols and indices have the following meanings:
$E^1$, $E^2$, $E^3$, $E^4$, $E^5$ and $E^6$ are —N—, —CF— or —CH—, with the following provisos:
  if $E^1$ ($E^4$) is —N— or —CF—, $E^2$ and $E^3$ ($E^5$ and $E^6$) must be —CH—;
  if $E^2$ and/or $E^3$ ($E^5$ and/or $E^6$) are —CF—, $E^1$ ($E^4$) must be —CH—;
  if $E^2$ ($E^5$) is —N—, $E^1$ ($E^4$) must be —CH—, while $E^3$ ($E^6$) can be —CH— or —CF—;
  and at least one of $E^1$ to $E^6$ must be —N— or —CF—;

G is —CH$_2$CH$_2$— or —CH=CH—;
$R^1$ and $R^2$, independently of one another, are
  (a) a hydrogen atom, —F, —Cl, —CN, —CF$_3$ or —OCF$_3$,
  (b) a straight-chain or branched-chain alkyl group (with or without an asymmetric carbon atom) having from 1 to 20 carbon atoms, in which b1) one or more non-adjacent and non-terminal —CH$_2$— groups may be replaced by —O—, —S—, —CO—, —CO—O—, —O—CO—, —O—CO—O— or —Si(CH$_3$)$_2$— and/or
  b2) one or more —CH$_2$— groups may be replaced by —CH=CH—, —C≡C—, 1,4-cyclohexylene, 1,4-phenylene, cyclopropane-1,2-diyl or 1,3-cyclopentylene and/or
  b3) one or more hydrogen atoms of the alkyl group may be substituted by F and/or Cl and/or
  b4) the terminal CH$_3$-group may be replaced by any one of the following chiral groups (optically active or racemic):

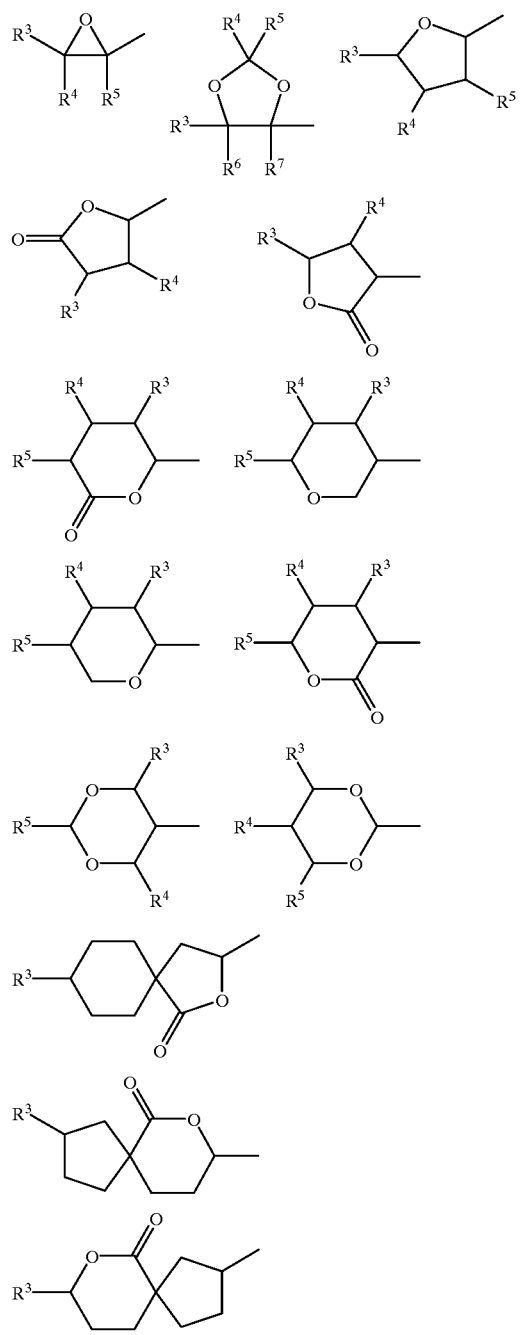

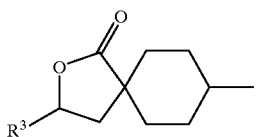
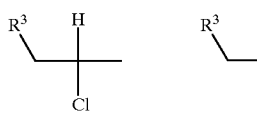
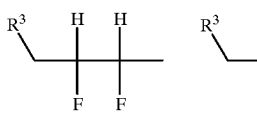

with the proviso that only one of $R^1$, $R^2$ can be a hydrogen atom, —F, —Cl, —CN, —CF$_3$ or —OCF$_3$;

$R^3$, $R^4$, $R^5$, $R^6$, $R^7$, independently of one another, are
a) a hydrogen atom,
b) a straight-chain or branched-chain alkyl group (with or without an asymmetric carbon atom) having from 1 to 16 carbon atoms, where
b1) one or more non-adjacent and non-terminal —CH$_2$— groups may be replaced by —O— and/or
b2) one or two —CH$_2$— groups may be replaced by —CH═CH— and/or
b3) one or more hydrogen atoms of the alkyl group may be substituted by F or Cl,
c) $R^4$ and $R^5$ may also together be —(CH$_2$)$_4$— or —(CH$_2$)$_5$— if they are bonded to an oxirane, dioxolane, tetrahydrofuran, tetrahydropyrane, butyrolactone or valerolactone system;

$M^1$, $M^2$, independently of one another, are —CO—O—, —O—CO—, —CH$_2$—O—, —O—CH$_2$—, —CH$_2$—CH$_2$—, —CH═CH—, —C≡C—, —CH$_2$—CH$_2$—CO—O—, —O—CO—CH$_2$—CH$_2$— or a single bond;

$A^1$, $A^2$, independently of one another, are 1,4-phenylene, in which one or more H atoms may be replaced by F, Cl and/or CN, pyridine-2,5-diyl, in which one H atom may be replaced by F, pyrimidine-2,5-diyl, pyrazine-2,5-diyl, in which one H atom may be replaced by F, pyridazin-3,6-diyl, in which one H atom may be replaced by F, 1,4-cyclohexylene in which one or two hydrogen atoms may be substituted by CN and/or F and/or CH$_3$, thiophene-2,5-diyl, [1,3,4]-thiadiazole-2,5-diyl, [1,3]-thiazole-2,4-diyl, [1,3]-thiazole-2,5-diyl or 1,3-dioxane-2,5-diyl;

a, b are 0 or 1 with the proviso, that compounds of the formula (II) may not contain more than three five- or six-membered ring systems;

C. 2-fluoropyridine derivatives of the formula (III),

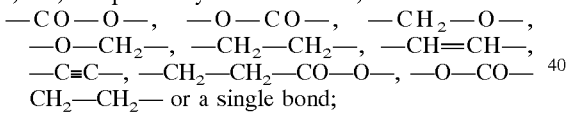

(III)

in which the symbols and indices have the following meanings:

$R^1$ and $R^2$, independently of one another, are
(a) a hydrogen atom, —F, —Cl, —CN, —CF$_3$ or —OCF$_3$,
(b) a straight-chain or branched-chain alkyl group (with or without an asymmetric carbon atom) having from 1 to 20 carbon atoms, in which
b1) one or more non-adjacent and non-terminal —CH$_2$— groups may be replaced by —O—, —S—, —CO—, —CO—O—, —O—CO—, —O—CO—O— or —Si(CH$_3$)$_2$— and/or
b2) one or more —CH$_2$— groups may be replaced by —CH═CH—, —C≡C—, 1,4-cyclohexylene, 1,4-phenylene, cyclopropane-1,2-diyl or 1,3-cyclopentylene and/or
b3) one or more hydrogen atoms of the alkyl group may be substituted by F and/or Cl and/or
b4) the terminal CH$_3$-group may be replaced by any one of the following chiral groups (optically active or racemic):

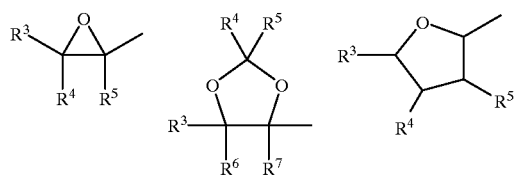
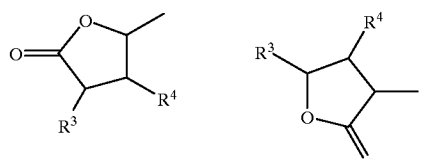
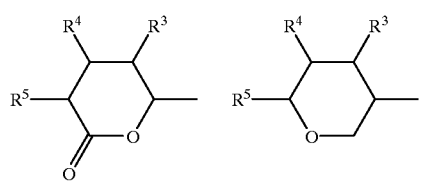
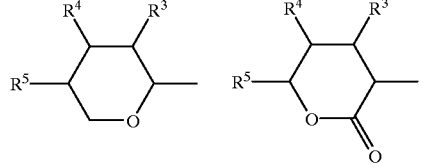
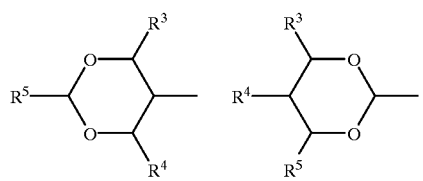
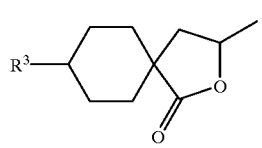
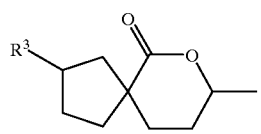

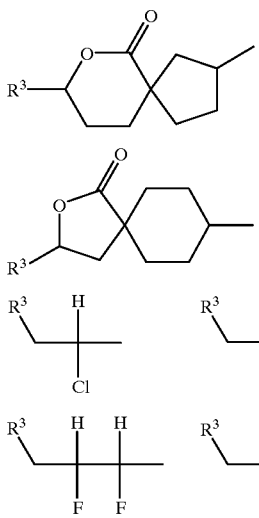

with the proviso that only one of $R^1$, $R^2$ can be a hydrogen atom, —F, —Cl, —CN, —CF$_3$ or —OCF$_3$;

$R^3$, $R^4$, $R^5$, $R^6$, $R^7$, independently of one another, are
  a) a hydrogen atom,
  b) a straight-chain or branched-chain alkyl group (with or without an asymmetric carbon atom) having from 1 to 16 carbon atoms, where
    b1) one or more non-adjacent and non-terminal —CH$_2$— groups may be replaced by —O— and/or
    b2) one or two —CH$_2$— groups may be replaced by —CH=CH— and/or
    b3) one or more hydrogen atoms of the alkyl group may be substituted by F or Cl,
  c) $R^4$ and $R^5$ may also together be —(CH$_2$)$_4$— or —(CH$_2$)$_5$— if they are bonded to an oxirane, dioxolane, tetrahydrofuran, tetrahydropyrane, butyrolactone or valerolactone system;

$M^1$, $M^2$, $M^3$, $M^4$, independently of one another, are —CO—O—, —O—CO—, —CH$_2$—O—, —O—CH$_2$—, —CH$_2$—CH$_2$—, —CH=CH—, —C≡C—, —CH$_2$—CH$_2$—CO—O—, —O—CO—CH$_2$—CH$_2$— or a single bond;

$A^1$, $A^2$, $A^3$, $A^4$, independently of one another, are 1,4-phenylene, in which one or more H atoms may be replaced by F, Cl and/or CN, pyridine-2,5-diyl, in which one H atom may be replaced by F, pyrimidine-2,5-diyl, pyrazine-2,5-diyl, in which one H atom may be replaced by F, pyridazin-3,6-diyl, in which one H atom may be replaced by F, 1,4-cyclohexylene in which one or two hydrogen atoms may be substituted by CN and/or F and/or CH$_3$, naphthalene-2,6-diyl, thiophene-2,5-diyl, [1,3,4]-thiadiazole-2,5-diyl, [1,3]-thiazole-2,4-diyl, [1,3]-thiazole-2,5-diyl or 1,3-dioxane-2,5-diyl;

a, b, c, d are 0 or 1 with the proviso, that compounds of the formula (III) may not contain more than four five- or six-membered ring systems;

D. phenylene derivatives of the formula (IV),

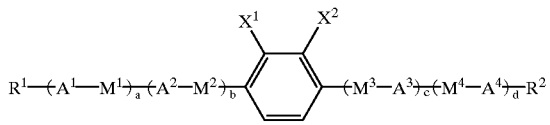

in which the symbols and indices have the following meanings:

$R^1$ and $R^2$, independently of one another, are
  (a) a hydrogen atom, —F, —Cl, —CN, —CF$_3$ or —OCF$_3$,
  (b) a straight-chain or branched-chain alkyl group (with or without an asymmetric carbon atom) having from 1 to 20 carbon atoms, in which
    b1) one or more non-adjacent and non-terminal —CH$_2$— groups may be replaced by —O—, —S—, —CO—, —CO—O—, —O—CO—, —O—CO—O— or —Si(CH$_3$)$_2$— and/or
    b2) one or more —CH$_2$— groups may be replaced by —CH=CH—, —C≡C—, 1,4-cyclohexylene, 1,4-phenylene, cyclopropane-1,2-diyl or 1,3-cyclopentylene and/or
    b3) one or more hydrogen atoms of the alkyl group may be substituted by F and/or Cl and/or
    b4) the terminal CH$_3$-group may be replaced by any one of the following chiral groups (optically active or racemic):

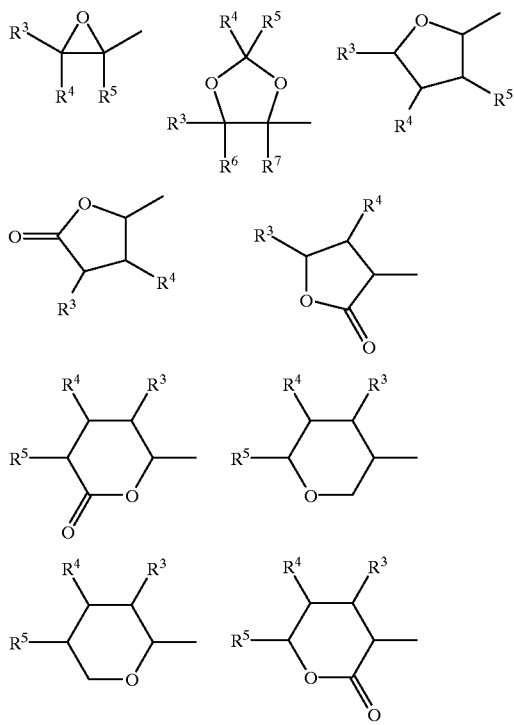

-continued

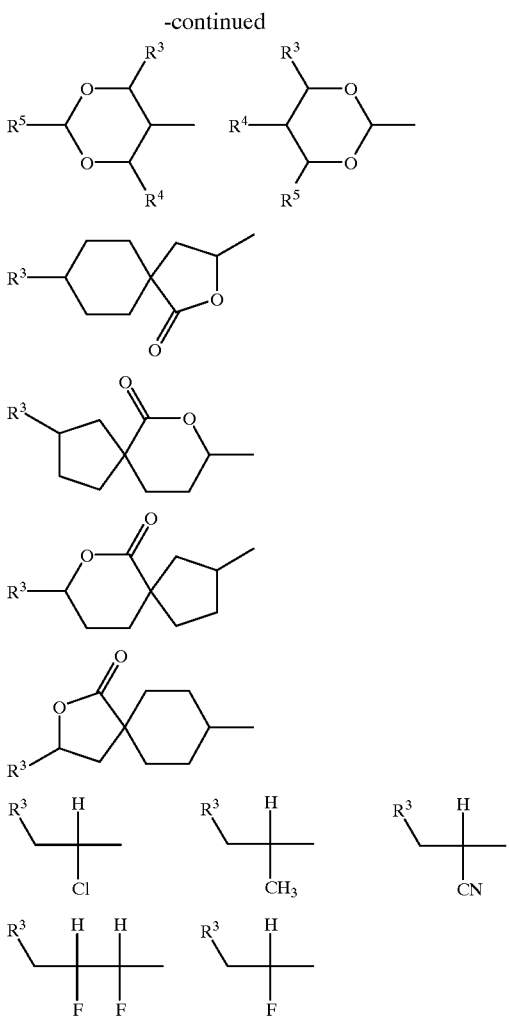

with the proviso that only one of $R^1$, $R^2$ can be a hydrogen atom, —F, —Cl, —CN, —CF$_3$ or —OCF$_3$;

$R^3$, $R^4$, $R^5$, $R^6$, $R^7$, independently of one another, are
a) a hydrogen atom,
b) a straight-chain or branched-chain alkyl group (with or without an asymmetric carbon atom) having from 1 to 16 carbon atoms, where
   b1) one or more non-adjacent and non-terminal —CH$_2$— groups may be replaced by —O— and/or
   b2) one or two —CH$_2$— groups may be replaced by —CH=CH— and/or
   b3) one or more hydrogen atoms of the alkyl group may be substituted by F or Cl,
c) $R^4$ and $R^5$ may also together be —(CH$_2$)$_4$— or —(CH$_2$)$_5$— if they are bonded to an oxirane, dioxolane, tetrahydrofuran, tetrahydropyrane, butyrolactone or valerolactone system;

$X^1$ and $X^2$, independently of one another, are hydrogen, F, Cl, CF$_3$ or CN, with the proviso that $X^1$ and $X^2$ are not simultaneously hydrogen;

$M^1$, $M^2$, $M^3$, $M^4$, independently of one another, are —CO—O—, —O—CO—, —CH$_2$—O—, —O—CH$_2$—, —CH$_2$—CH$_2$—, —CH=CH—, —C≡C—, —CH$_2$—CH$_2$—CO—O—, —O—CO—CH$_2$—CH$_2$— or a single bond;

$A^1$, $A^2$, $A^3$, $A^4$, independently of one another, are 1,4-phenylene, in which one or more H atoms may be replaced by F, Cl and/or CN, pyridine-2,5-diyl, in which one H atom may be replaced by F, pyrimidine-2,5-diyl, pyrazine-2,5-diyl, in which one H atom may be replaced by F, pyridazin-3,6-diyl, in which one H atom may be replaced by F, 1,4-cyclohexylene in which one or two hydrogen atoms may be substituted by CN and/or F and/or CH$_3$, naphthalene-2,6-diyl, 1,2,3,4-tetrahydronapthalene-2,6-diyl, thiophene-2,5-diyl, [1,3,4]-thiadiazole-2,5-diyl, [1,3]-thiazole-2,4-diyl, [1,3]-thiazole-2,5-diyl or 1,3-dioxane-2,5-diyl;

a, b, c, d are 0 or 1 with the proviso, that compounds of the formula (IV) may not contain more than four five- or six-membered ring systems;

E. meta-substituted aromatic compounds of the formula (V):

(V)

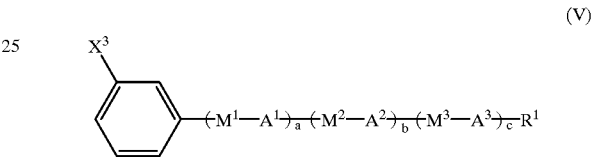

wherein the symbols and indices have the following meanings:

$X^3$ is
(a) —F, —Cl, —Br, —CN, —CF$_3$ or —OCF$_3$,
(b) a straight-chain or branched-chain alkyl group (with or without an asymmetric carbon atom) having from 1 to 12 carbon atoms, in which
   b1) one or two non-adjacent and non-terminal —CH$_2$— groups may be replaced by —O—, —S—, —CO—, —CO—O— or —O—CO— and/or
   b2) one or more hydrogen atoms of the alkyl group may be substituted by F and/or Cl and/or CN;

$R^1$ is
(a) a hydrogen atom, —F, —Cl, —CN, —CF$_3$ or —OCF$_3$,
(b) a straight-chain or branched-chain alkyl group (with or without an asymmetric carbon atoms) having from 1 to 20 carbon atoms, in which
   b1) one or more non-adjacent and non-terminal —CH$_2$— groups may be replaced by —O—, —S—, —CO—, —CO—O—, —O—CO—, —O—CO—O— or —Si(CH$_3$)$_2$— and/or
   b2) one or more —CH$_2$— groups may be replaced by —CH=CH—, —C≡C—, 1,4-cyclohexylene, 1,4-phenylene, cyclopropane-1,2-diyl or 1,3-cyclopentylene and/or
   b3) one or more hydrogen atoms of the alkyl group may be substituted by F and/or Cl and/or
   b4) the terminal CH$_3$-group may be replaced by any one of the following chiral groups (optically active or racemic):

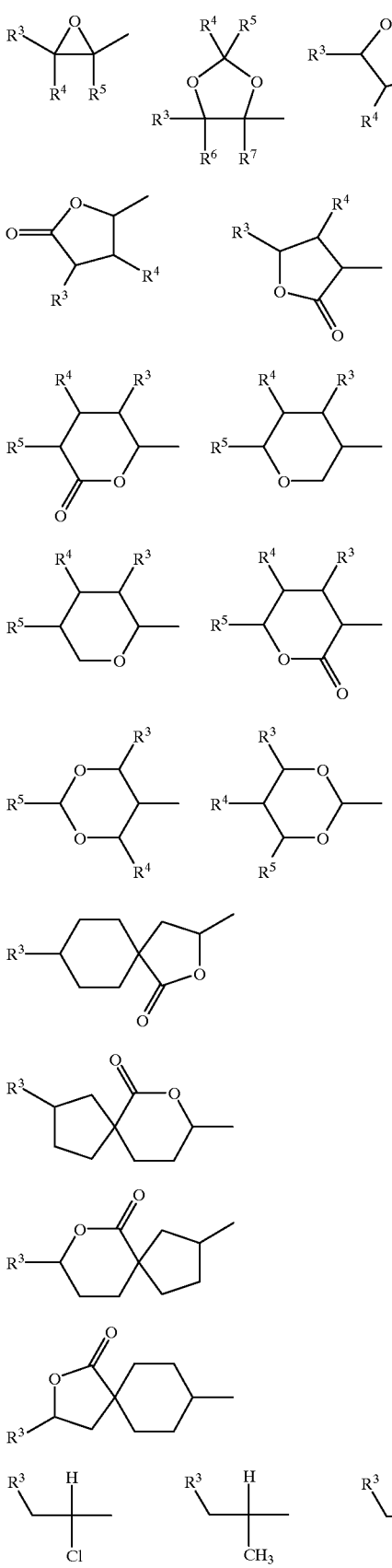

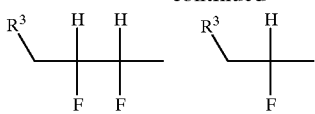

with the proviso that $R^1$ can not be a hydrogen atom, —F, —Cl, —CN, —CF$_3$ or —OCF$_3$ if $X^3$ is —F, —Cl, —Br, —CN, —CF$_3$ or —OCF$_3$;

$R^3$, $R^4$, $R^5$, $R^6$, $R^7$, independently of one another, are
a) a hydrogen atom,
b) a straight-chain or branched-chain alkyl group (with or without an asymmetric carbon atom) having from 1 to 16 carbon atoms, where
  b1) one or more non-adjacent and non-terminal —CH$_2$— groups may be replaced by —O— and/or
  b2) one or two —CH$_2$— groups may be replaced by —CH=CH— and/or
  b3) one or more hydrogen atoms of the alkyl group may be substituted by F or Cl,
c) $R^4$ and $R^5$ may also together be —(CH$_2$)$_4$— or —(CH$_2$)$_5$— if they are bonded to an oxirane, dioxolane, tetrahydrofuran, tetrahydropyrane, butyrolactone or valerolactone system;

$M^1$, $M^2$, $M^3$, independently of one another, are —CO—O—, —O—CO—, —CH$_2$—O—, —O—CH$_2$—, —CH$_2$—CH$_2$—, —CH=CH—, —C≡C—, —CH$_2$—CH$_2$—CO—O—, —O—CO—CH$_2$—CH$_2$— or a single bond;

$A^1$, $A^2$, $A^3$, independently of one another, are 1,4-phenylene, in which one or more H atoms may be replaced by F, Cl and/or CN, pyridine-2,5-diyl, in which one H atom may be replaced by F, pyrimidine-2,5-diyl, pyrazine-2,5-diyl, in which one H atom may be replaced by F, pyridazin-3,6-diyl, in which one H atom may be replaced by F, 1,4-cyclohexylene in which one or two hydrogen atoms may be substituted by CN and/or F and/or CH$_3$, naphthalene-2,6-diyl, thiophene-2,5-diyl, [1,3,4]-thiadiazole-2,5-diyl, [1,3]-thiazole-2,4-diyl, [1,3]-thiazole-2,5-diyl or 1,3-dioxane-2,5-diyl;

a, b, c are 0 or 1 with the proviso, that compounds of the formula (V) may not contain more than four five- or six-membered ring systems;

F. (1,3,4)-thiadiazoles of the formula (VI):

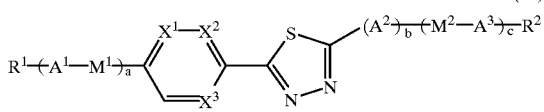

(VI)

wherein the symbols and indices have the following meanings:

$R^1$ and $R^2$, independently of one another, are
(a) a hydrogen atom, —F, —Cl, —CN, —CF$_3$ or —OCF$_3$,
(b) a straight-chain or branched-chain alkyl group (with or without an asymmetric carbon atom) having from 1 to 20 carbon atoms, in which
  b1) one or more non-adjacent and non-terminal —CH$_2$— groups may be replaced by —O—, —S—, —CO—, —CO—O—, —O—CO—, —O—CO—O— or —Si(CH$_3$)$_2$— and/or b2) one or more —CH$_2$— groups may be replaced by —CH=CH—, —C≡C—, 1,4-cyclohexylene, 1,4-phenylene, cyclopropane-1,2-diyl or 1,3-cyclopentylene and/or
b3) one or more hydrogen atoms of the alkyl group may be substituted by F and/or Cl and/or
b4) the terminal CH$_3$-group may be replaced by any one of the following chiral groups (optically active or racemic):

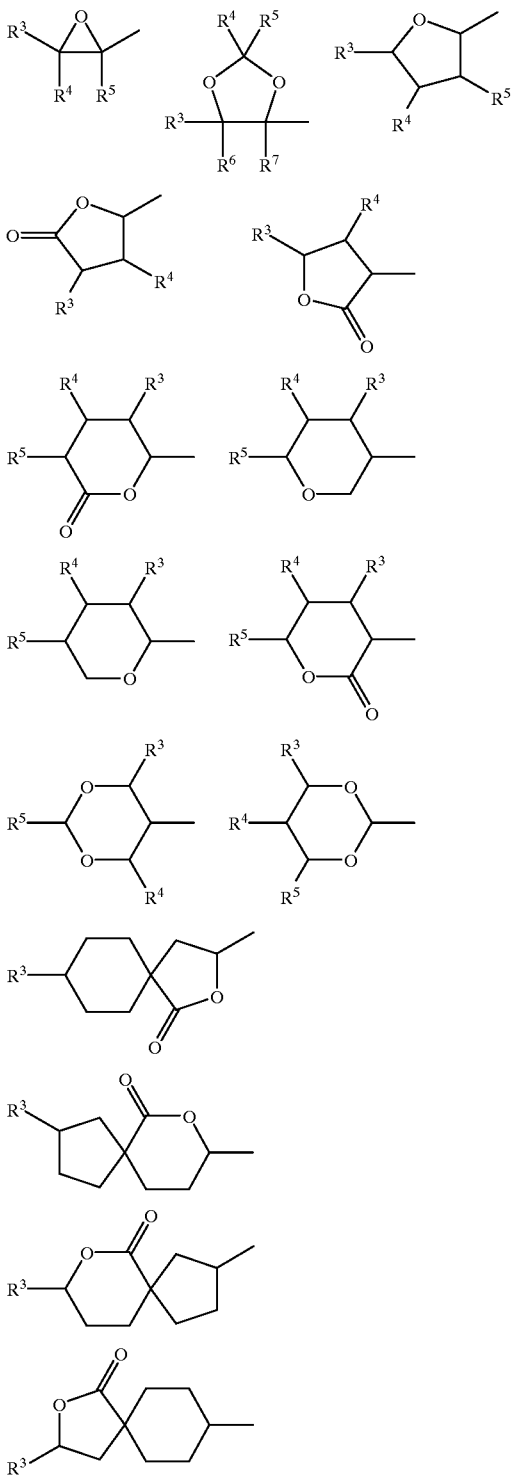

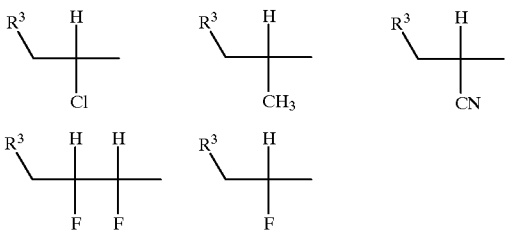

with the proviso that only one of R$^1$, R$^2$ can be a hydrogen atom, —F, —Cl, —CN, —CF$_3$ or —OCF$_3$;

R$^3$, R$^4$, R$^5$, R$^6$, R$^7$, independently of one another, are
  a) a hydrogen atom,
  b) a straight-chain or branched-chain alkyl group (with or without an asymmetric carbon atom) having from 1 to 16 carbon atoms, where
    b1) one or more non-adjacent and non-terminal —CH$_2$— groups may be replaced by —O— and/or
    b2) one or two —CH$_2$— groups may be replaced by —CH=CH— and/or
    b3) one or more hydrogen atoms of the alkyl group may be substituted by F or Cl,
  c) R$^4$ and R$^5$ may also together be —(CH$_2$)$_4$— or —(CH$_2$)$_5$— if they are bonded to an oxirane, dioxolane, tetrahydrofuran, tetrahydropyrane, butyrolactone or valerolactone system;

X$^1$, X$^2$, X$^3$, independently of one another, are —CF—, —N— or —CH—;

M$^1$, M$^2$, independently of one another, are —CO—O—, —O—CO—, —CH$_2$—O—, —O—CH$_2$—, —CH$_2$—CH$_2$—, —CH=CH—, —C≡C—, —CH$_2$—CH$_2$—CO—O—, —O—CO—CH$_2$—CH$_2$— or a single bond;

A$^1$, A$^2$, A$^3$, independently of one another, are 1,4-phenylene, in which one or more H atoms may be replaced by F, Cl and/or CN, pyridine-2,5-diyl, in which one H atom may be replaced by F, pyrimidine-2,5-diyl, pyrazine-2,5-diyl, in which one H atom may be replaced by F, pyridazin-3,6-diyl, in which one H atom may be replaced by F, 1,4-cyclohexylene in which one or two hydrogen atoms may be substituted by CN and/or F and/or CH$_3$, naphthalene-2,6-diyl, thiophene-2,5-diyl, [1,3,4]-thiadiazole-2,5-diyl, [1,3]-thiazole-2,4-diyl, [1,3]-thiazole-2,5-diyl or 1,3-dioxane-2,5-diyl;

a, b, c are 0 or 1 with the proviso, that compounds of the formula (VI) may not contain more than four five- or six-membered ring systems;

G. 4-cyanocyclohexyls of the formula (VII):

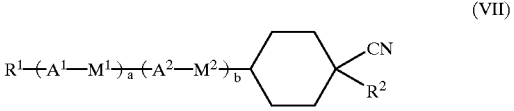

(VII)

wherein the symbols and indices have the following meanings:

R$^1$ is
  (a) a hydrogen atom, —F, —Cl, —CN, —CF$_3$ or —OCF$_3$,
  (b) a straight-chain or branched-chain alkyl group (with or without an asymmetric carbon atom) having from 1 to 20 carbon atoms, in which b1) one or more non-adjacent and non-terminal —CH$_2$— groups may be replaced by —O—, —S—, —CO—, —CO—O—, —O—CO—, —O—CO—O— or —Si(CH$_3$)$_2$— and/or b2) one or more —CH$_2$— groups may be replaced by —CH=CH—, —C≡C—, 1,4-cyclohexylene, 1,4-phenylene, cyclopropane-1,2-diyl or 1,3-cyclopentylene and/or b3) one or more hydrogen atoms of the alkyl group may be substituted by F and/or Cl and/or b4) the terminal CH$_3$-group may be replaced by any one of the following chiral groups (optically active or racemic):

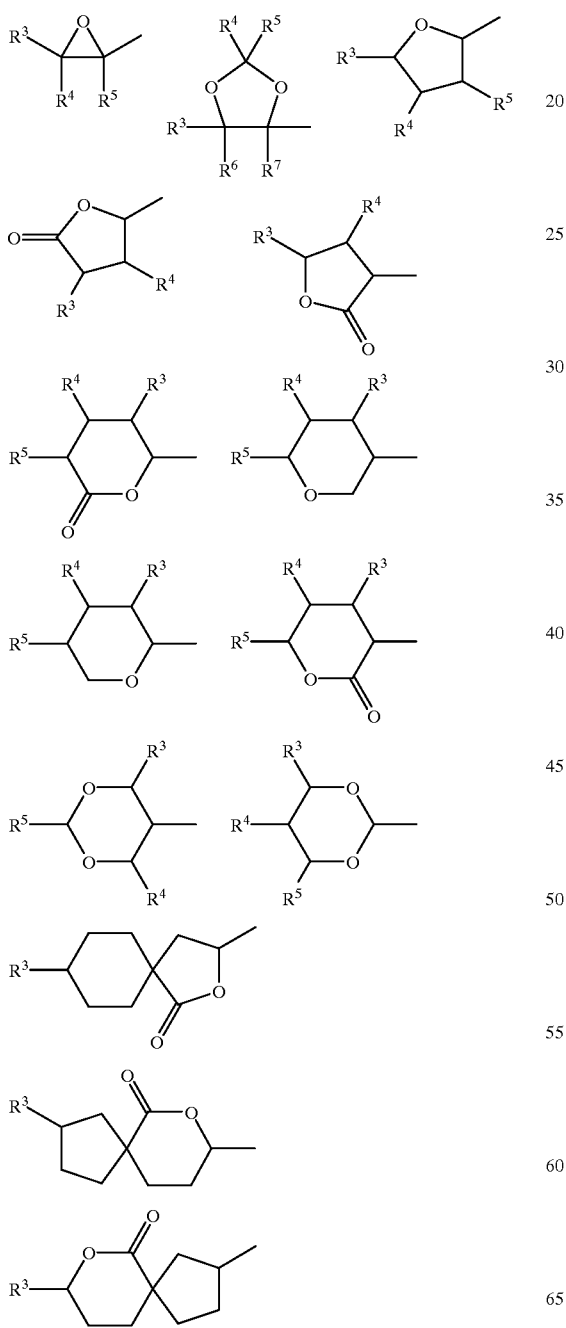

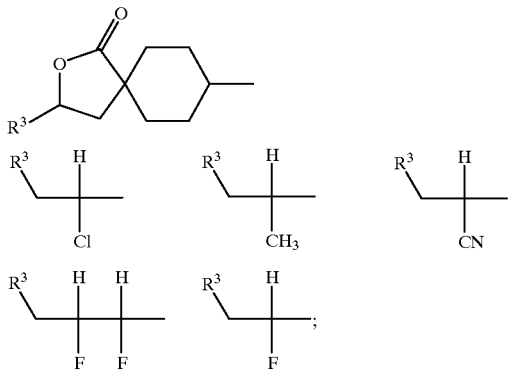

$R^2$ is
  (a) a straight-chain or branched-chain alkyl group (with or without an asymmetric carbon atom), having from 1 to 16 carbon atoms, in which
    a1) one or two non-adjacent and non-terminal —CH$_2$— groups may be replaced by —O—, —S—, —CO—, —CO—O—, —O—CO— or —Si(CH$_3$)$_2$— and/or
    a2) one or two —CH$_2$— groups may be replaced by —CH=CH—, —C≡C— and/or
    a3) one or more hydrogen atoms of the alkyl group may be substituted by F and/or Cl and/or CN and/or CF$_3$;

$R^3$, $R^4$, $R^5$, $R^6$, $R^7$, independently of one another, are
  a) a hydrogen atom,
  b) a straight-chain or branched-chain alkyl group (with or without an asymmetric carbon atom) having from 1 to 16 carbon atoms, where
    b1) one or more non-adjacent and non-terminal —CH$_2$— groups may be replaced by —O— and/or
    b2) one or two —CH$_2$— groups may be replaced by —CH=CH— and/or
    b3) one or more hydrogen atoms of the alkyl group may be substituted by F or Cl,
  c) $R^4$ and $R^5$ may also together be —(CH$_2$)$_4$— or —(CH$_2$)$_5$— if they are bonded to an oxirane, dioxolane, tetrahydrofuran, tetrahydropyrane, butyrolactone or valerolactone system;

$M^1$, $M^2$, independently of one another, are
  —CO—O—, —O—CO—, —CH$_2$—O—, —O—CH$_2$—, —CH$_2$—CH$_2$—, —CH=CH—, —C≡C—, —CH$_2$—CH$_2$—CO—O—, —O—CO—CH$_2$—CH$_2$— or a single bond;

$A^1$, $A^2$, independently of one another, are
  1,4-phenylene, in which one or more H atoms may be replaced by F, Cl and/or CN, pyridine-2,5-diyl, in which one H atom may be replaced by F, pyrimidine-2,5-diyl, pyrazine-2,5-diyl, in which one H atom may be replaced by F, pyridazin-3,6-diyl, in which one H atom may be replaced by F, 1,4-cyclohexylene in which one or two hydrogen atoms may be substituted by CN and/or F and/or CH$_3$, naphthalene-2,6-diyl, thiophene-2,5-diyl, [1,3,4]-thiadiazole-2,5-diyl, [1,3]-thiazole-2,4-diyl, [1,3]-thiazole-2,5-diyl or 1,3-dioxane-2,5-diyl;

a, b are 0 or 1 with the proviso, that compounds of the formula (VII) may not contain more than four five- or six-membered ring systems.

A further object of the invention is to provide a ferroelectric liquid crystal display device, especially one operated in the $\tau V_{min}$ mode, using the above described mixture.

Yet a further object of the invention is the use of the above described mixture in a ferroelectric liquid crystal display, especially one operated in the $\tau V_{min}$ mode.

Mixtures according to the invention are distinguished, inter alia, by a large absolute value of the dielectric anisotropy, a low viscosity, low melting point and super-cooling. They are capable of achieving a high response speed and a low voltage driving.

Preferred are those compounds of group A, in which the symbols and indices in the formula (I) have the following meanings:

$R^1$ and $R^2$, independently of one another, are
  (a) a hydrogen atom,
  (b) a straight-chain or branched-chain alkyl group, with or without asymmetric carbon atoms, having from 1 to 16 carbon atoms, in which
    b1) one or two non-adjacent and non-terminal —CH$_2$— groups may be replaced by —O—, —CO—O—, —O—CO— or —Si(CH$_3$)$_2$— and/or
    b2) one —CH$_2$— group may be replaced by trans-1,4-cyclohexylene, 1,4-phenylene or cyclopropane-1,2-diyl and/or
    b3) one or more hydrogen atoms of the alkyl group may be substituted by F and/or
    b4) the terminal CH$_3$-group may be replaced by any one of the following chiral groups (optically active or racemic):

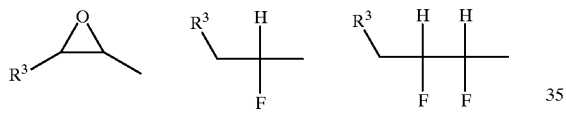

with the proviso that only one of $R^1$, $R^2$ can be a hydrogen atom;

$R^3$, $R^4$, $R^5$, $R^6$, $R^7$, independently of one another, are
  a) a hydrogen atom,
  b) a straight-chain or branched-chain alkyl group (with or without asymmetric carbon atoms) having from 1 to 12 carbon atoms, where
    b1) one non-terminal —CH$_2$— group may be replaced by —O—,
  c) $R^4$ and $R^5$ may also together be —(CH$_2$)$_4$— or —(CH$_2$)$_5$— if they are bonded to an oxirane, dioxolane, tetrahydrofuran, tetrahydropyrane, butyrolactone or valerolactone system;

$A^1$, $A^2$, $A^3$, $A^4$, independently of one another, are
  1,4-phenylene, in which one or two H atoms may be replaced by F, pyridine-2,5-diyl, in which one H atom may be replaced by F, pyrimidine-2,5-diyl, pyrazine-2,5-diyl, trans-1,4-cyclohexylene, thiophene-2,5-diyl, in which one or two H atoms may be replaced by F, [1,3,4]-thiadiazole-2,5-diyl, or [1,3]-thiazole-2,5-diyl, in which one H atom may be replaced by F.

X is H or F and Y are both H or F;

a, b, c, d are 0 or 1 with the proviso, that compounds of the formula (I) may not contain more than four five- or six-membered ring systems;

Examples of particularly preferred compounds of the formula (I) include:

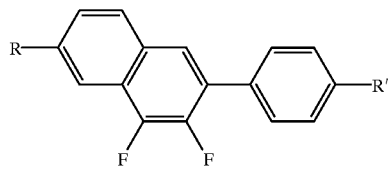
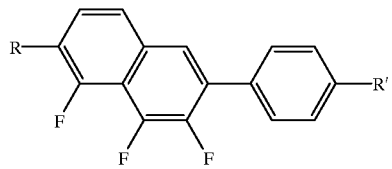
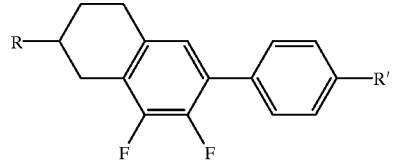
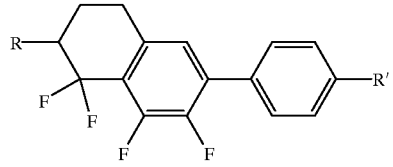
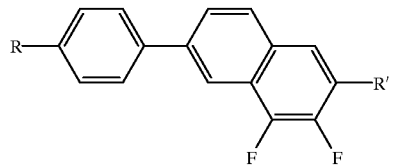
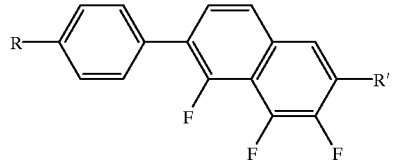
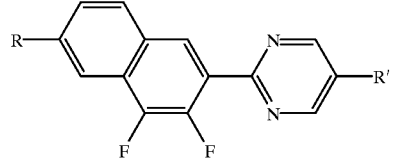
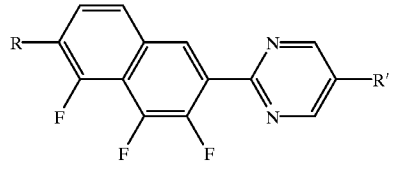
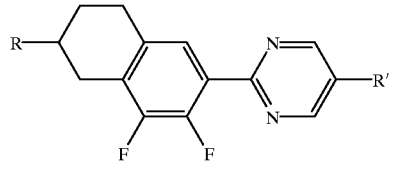

-continued
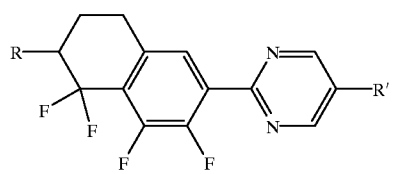
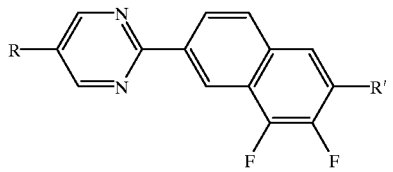
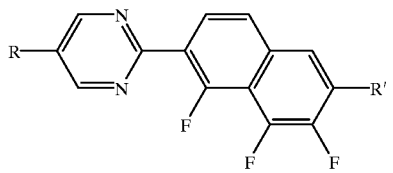
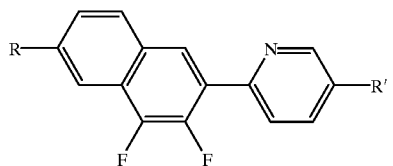
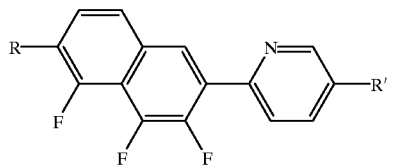
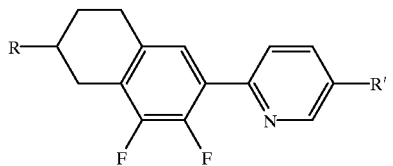
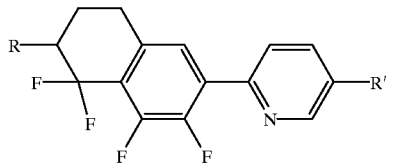
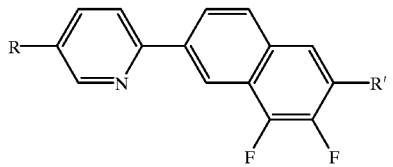
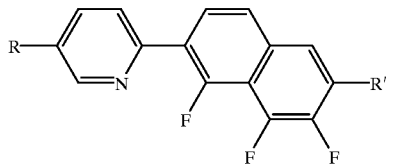
-continued
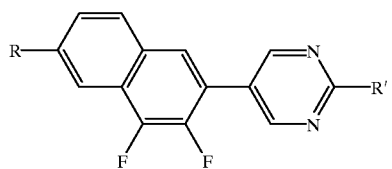
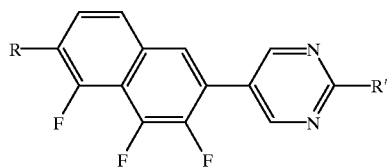
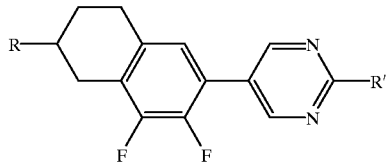
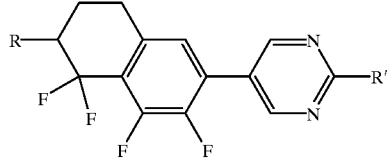
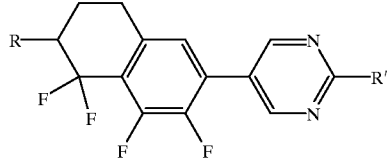
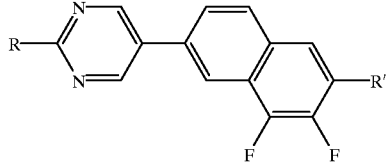
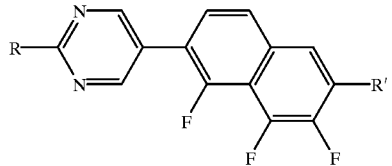
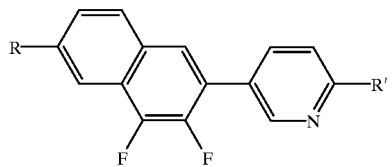
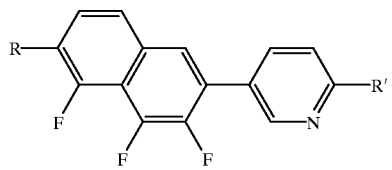

-continued
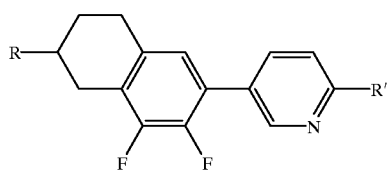
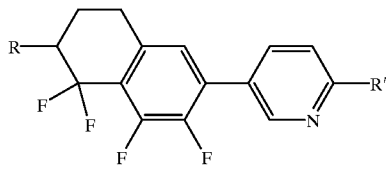
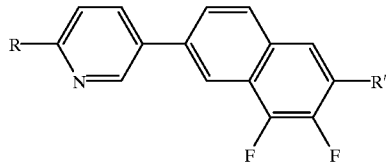
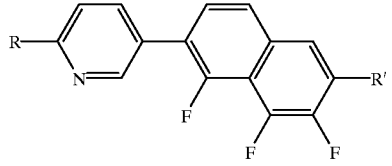
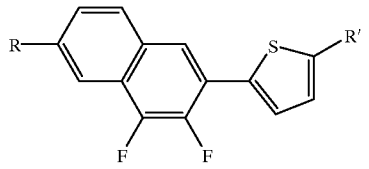
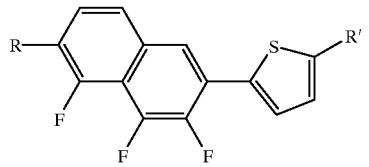
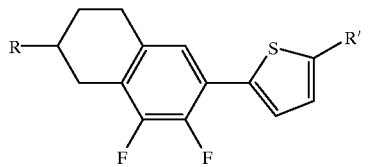
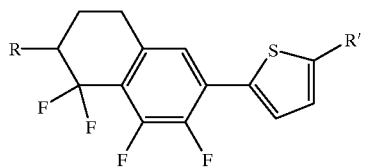
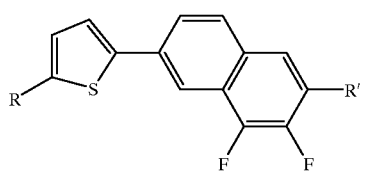
-continued
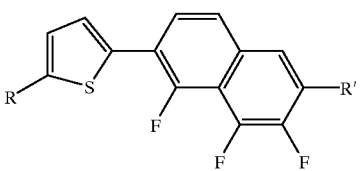
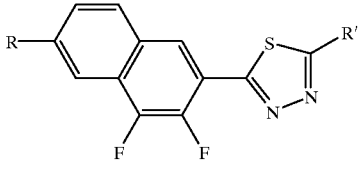
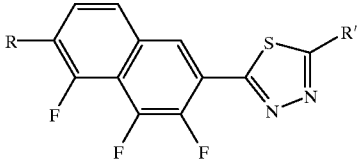
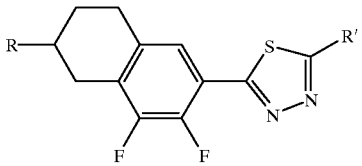
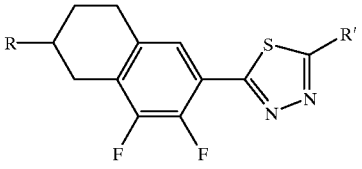
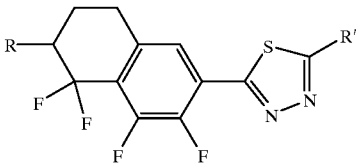
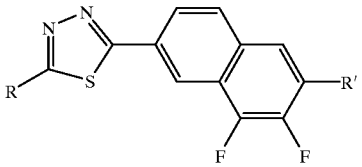
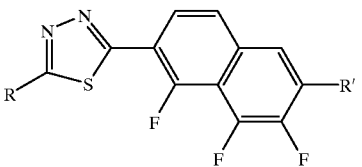
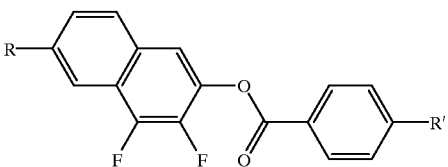

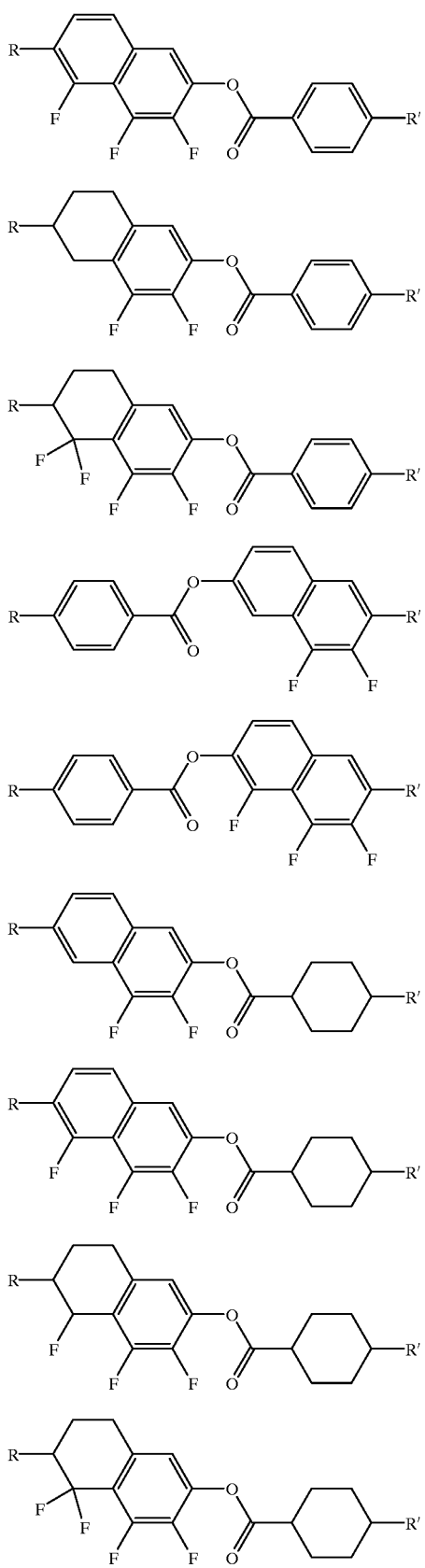
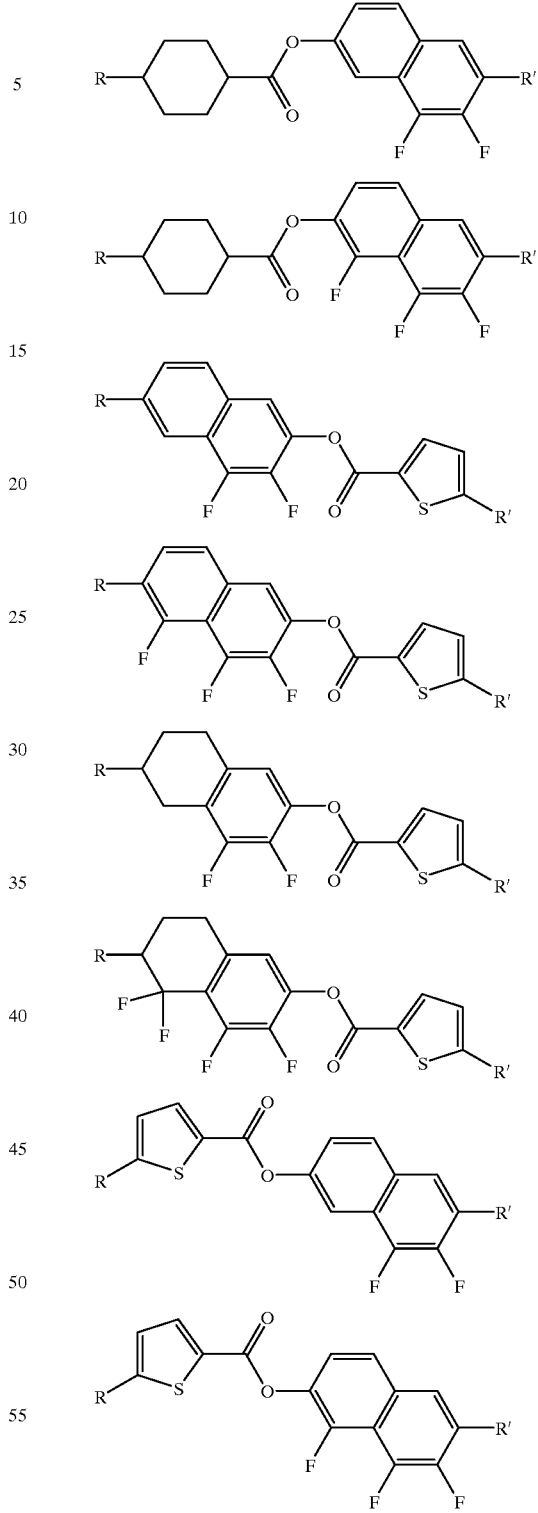
wherein R and R' have the same meanings as $R^1$ and $R^2$ in formula (I).
Further particular preference is given to the compounds of the formula (I) in which $R^1$ and $R^2$ are a straight-chain or branched-chain alkyl group having from 1 to 14 carbon atoms (with or without asymmetric carbon atoms), in which one or two —CH$_2$— groups may also be replaced by —O—, cyclopropane-1,2-diyl or —Si(CH$_3$)$_2$—, with the proviso that oxygen atoms must not be bonded directly to one another; one or more hydrogen atoms of the alkyl group may be substituted by F; R$^1$ or R$^2$ can also be hydrogen, but not both simultaneously.

Very particularly preferred are the following compounds of the formula (I):

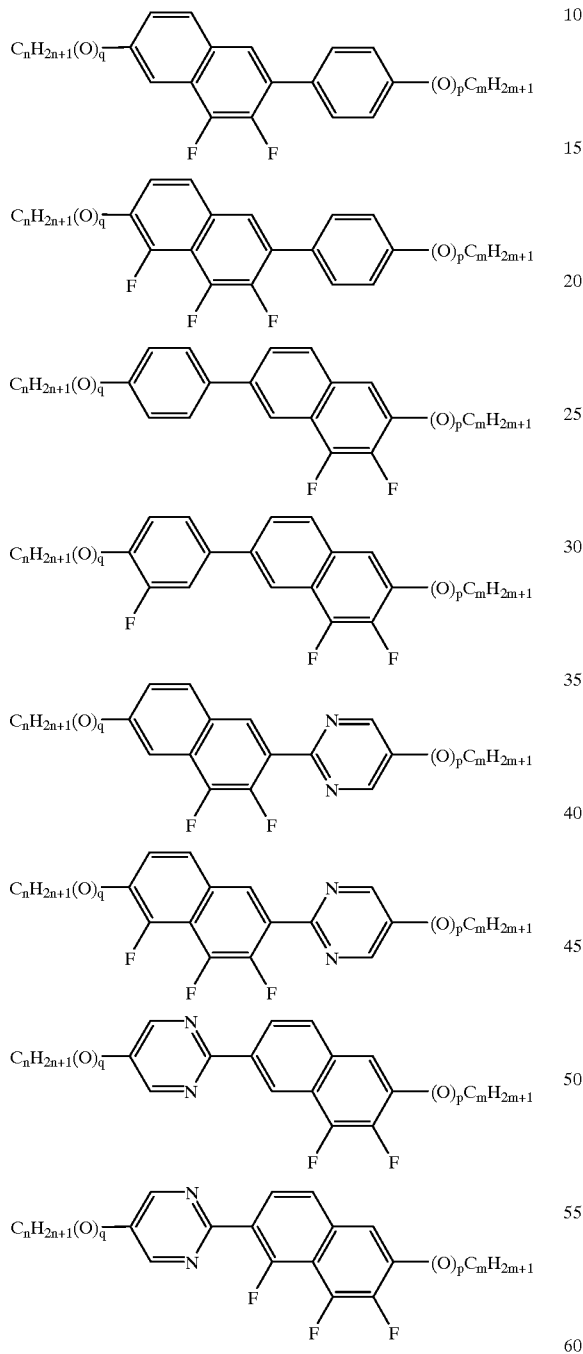

wherein n and m, independently from one another, are 0 to 16 (with the proviso that 3<n+m<29) and q and p, independently from one another, are 0 or 1.

Preferred are those compounds of group B, in which the symbols and indices in the formula (II) have the following meanings:

E$^1$, E$^2$, E$^3$, E$^4$, E$^5$ and E$^6$ are —N—, —CF— or —CH—, with the following provisos:
  if E$^1$ and/or E$^4$ are —N— or —CF—, E$^2$, E$^3$, E$^5$ and E$^6$ must be —CH—;
  if E$^2$ and/or E$^3$ and/or E$^5$ and/or E$^6$ are —CF—, E$^1$ and E$^4$ must be —CH—;
  if E$^2$ and/or E$^5$ are —N—, E$^1$ and E$^4$ must be —CH—, while E$^3$ and/or E$^6$ can be —CH— or —CF—;
  and at least one of E$^1$ to E$^6$ must be —N— or —CF—;

R$^1$ and R$^2$, independently of one another, are
  (a) a hydrogen atom,
  (b) a straight-chain or branched-chain alkyl group (with or without an asymmetric carbon atom) having from 1 to 16 carbon atoms, in which
    b1) one or two non-adjacent and non-terminal —CH$_2$— groups may be replaced by —O—, —CO—O—, —O—CO— or —Si(CH$_3$)$_2$— and/or
    b2) one —CH$_2$— group may be replaced by trans-1,4-cyclohexylene, 1,4-phenylene or cyclopropane-1,2-diyl and/or
    b3) one or more hydrogen atoms of the alkyl group may be substituted by F and/or
    b4) the terminal CH$_3$-group may be replaced by any one of the following chiral groups (optically active or racemic):

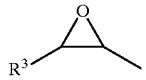 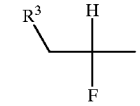 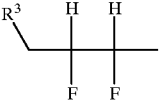

with the proviso that only one of R$^1$, R$^2$ can be a hydrogen atom;

R$^3$, R$^4$, R$^5$, R$^6$, R$^7$, independently of one another, are
  a) a hydrogen atom,
  b) a straight-chain or branched-chain alkyl group (with or without an asymmetric carbon atom) having from 1 to 12 carbon atoms, where
    b1) one non-terminal —CH$_2$— group may be replaced by —O—,
  c) R$^4$ and R$^5$ may also together be —(CH$_2$)$_4$— or —(CH$_2$)$_5$— if they are bonded to an oxirane, dioxolane, tetrahydrofuran, tetrahydropyrane, butyrolactone or valerolactone system;

M$^1$, M$^2$, independently of one another, are
  —CO—O—, —O—CO—, —CH$_2$—O—, —O—CH$_2$— or a single bond;

A$^1$, A$^2$, independently of one another, are
  1,4-phenylene, in which one or two H atoms may be replaced by F, pyridine-2,5-diyl, in which one H atom may be replaced by F, pyrimidine-2,5-diyl, trans- 1,4-cyclohexylene, thiophene-2,5-diyl, [1,3,4]-thiadiazole-2,5-diyl or [1,3]-thiazole-2,5-diyl.

Particular preference is given to the compounds of the formula (IIa) in which E$^1$ and/or E$^4$ are —CF—:

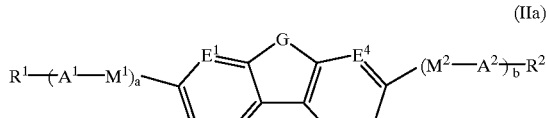

(IIa)

wherein R and R' have the same meanings as $R^1$ and $R^2$ in formula (II), and of these, very particular preference is given to the following compounds:

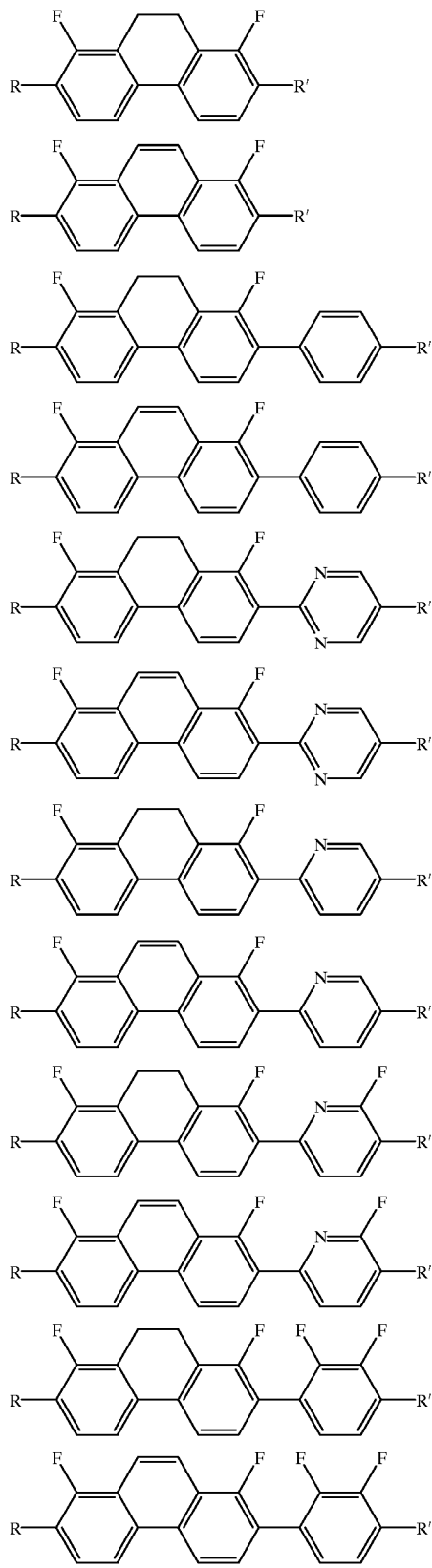

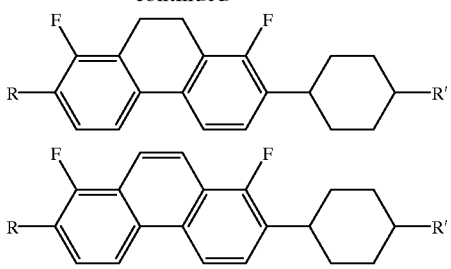

wherein R and R' have the same meanings as $R^1$ and $R^2$ in formula (II).

Further very particular preference is given to the compounds of the formula (IIa) in which $R^1$ and $R^2$ are a straight-chain or branched-chain alkyl group having from 1 to 16 carbon atoms (with or without asymmetric carbon atoms), in which one or two —$CH_2$— groups may be replaced by —O—, cyclopropane-1,2-diyl or —$Si(CH_3)_2$—, with the proviso that oxygen atoms must not be bonded directly to one another; one or more hydrogen atoms of the alkyl group may be substituted by F; $R^1$ or $R^2$ can also be hydrogen, but not both simultaneously.

Particular preference is furthermore given to compounds of the formula (IIb) in which $E^2$, $E^3$, $E^5$ and $E^6$, independently of one another, are —CH— or —CF—, and at least one of those is —CF—:

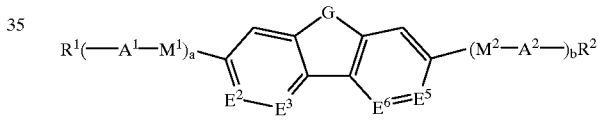

(IIb)

wherein $R^1$ and $R^2$ have the same meanings as in formula (II), and of these, very particular preference is given to the following compounds:

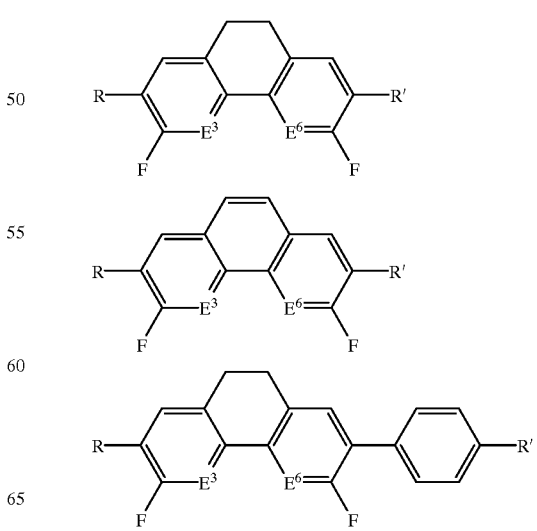

-continued

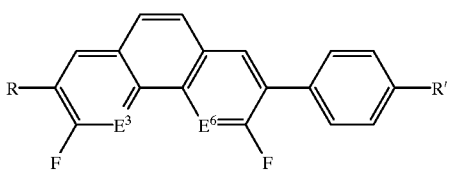
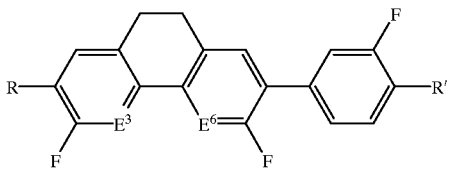
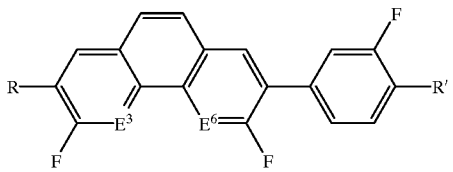
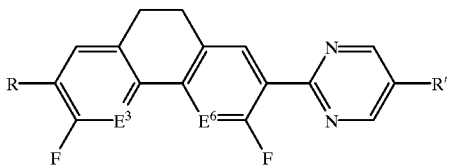
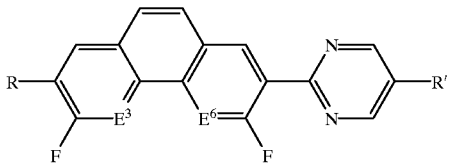
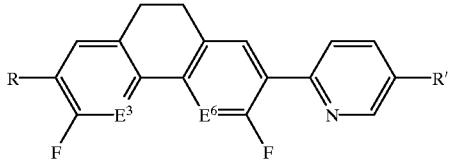
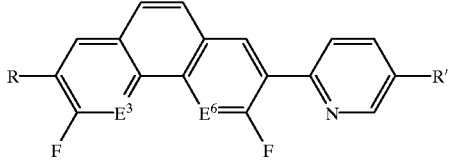
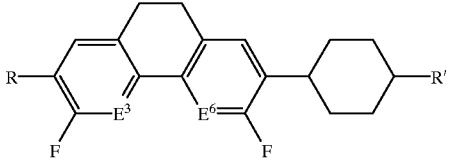
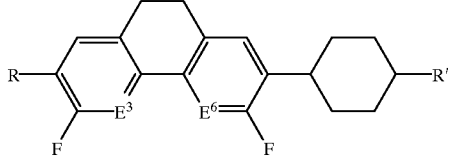

-continued

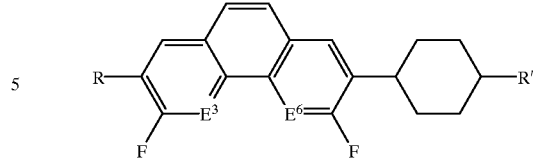

wherein R and R' have the same meanings as $R^1$ and $R^2$ in formula (II).

Further very particular preference is given to the compounds of the formula (IIb) in which $R^1$ and $R^2$ are a straight-chain or branched-chain alkyl group having from 1 to 16 carbon atoms (with or without an asymmetric carbon atom), in which one or two —$CH_2$— groups may also be replaced by —O—, cyclopropane-1,2-diyl or —$Si(CH_3)_2$—, with the proviso that oxygen atoms must not be bonded directly to one another; one or more hydrogen atoms of the alkyl group may be substituted by F; $R^1$ or $R^2$ can also be hydrogen, but not both simultaneously.

Preferred compounds of component C., i.e. 2-fluoropyridine derivatives of the formula (III), are those in which the symbols and indices have the following meanings:

$R^1$ and $R^2$, independently of one another, are
(a) a hydrogen atom,
(b) a straight-chain or branched-chain alkyl group (with or without an asymmetric carbon atom) having from 1 to 16 carbon atoms, in which
b1) one or two non-adjacent and non-terminal —$CH_2$— groups may be replaced by —O—, —CO—O—, —O—CO— or —$Si(CH_3)_2$— and/or
b2) one or more hydrogen atoms of the alkyl group may be substituted by F and/or
b3) the terminal $CH_3$-group may be replaced by any one of the following chiral groups (optically active or racemic):

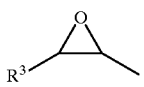 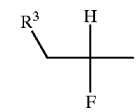 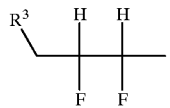

with the proviso that only one of $R^1$, $R^2$ can be a hydrogen atom;

$R^3$, $R^4$, $R^5$, $R^6$, $R^7$, independently of one another, are
a) a hydrogen atom,
b) a straight-chain or branched-chain alkyl group (with or without an asymmetric carbon atom) having from 1 to 12 carbon atoms, where
b1) one non-terminal —$CH_2$— group may be replaced by —O—,
c) $R^4$ and $R^5$ may also together be —$(CH_2)_4$— or —$(CH_2)_5$— if they are bonded to an oxirane, dioxolane, tetrahydrofuran, tetrahydropyrane, butyrolactone or valerolactone system;

$M^1$, $M^2$, $M^3$, $M^4$, independently of one another, are —CO—O—, —O—CO—, —$CH_2$—O—, —O—$CH_2$— or a single bond;

$A^1$, $A^2$, $A^3$, $A^4$, independently of one another, are 1,4-phenylene, in which one or two H atoms may be replaced by F, pyridine-2,5-diyl, in which one H atom may be replaced by F, pyrimidine-2,5-diyl, trans-1,4-cyclohexylene, thiophene-2,5-diyl or [1,3]-thiazole-2,5-diyl.
Particularly preferred compounds of the formula (III) include:
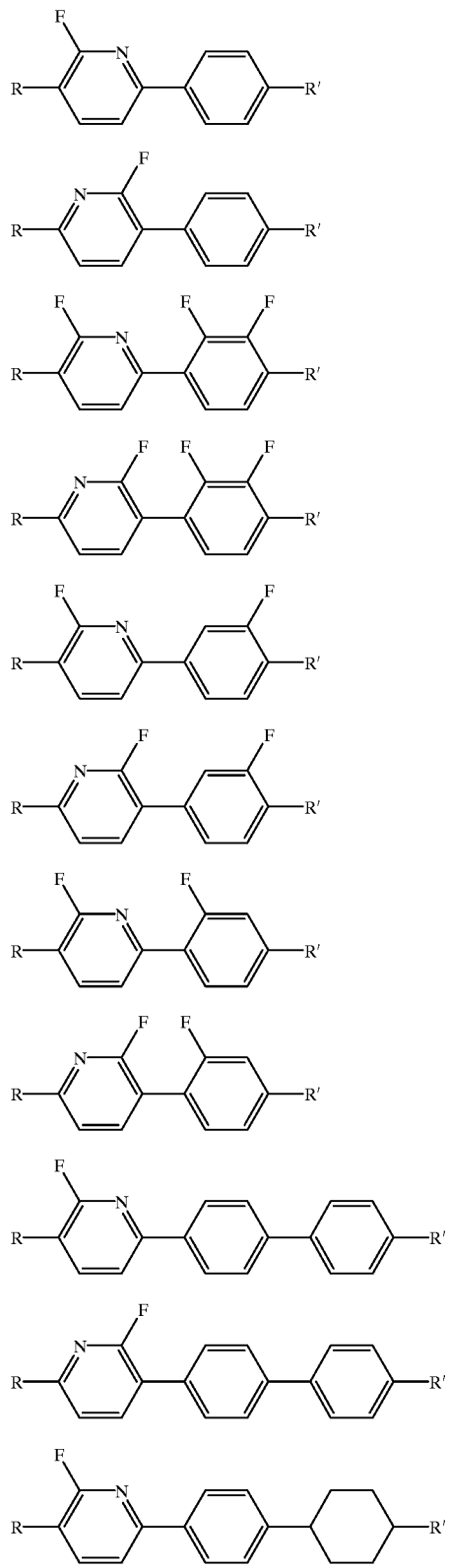
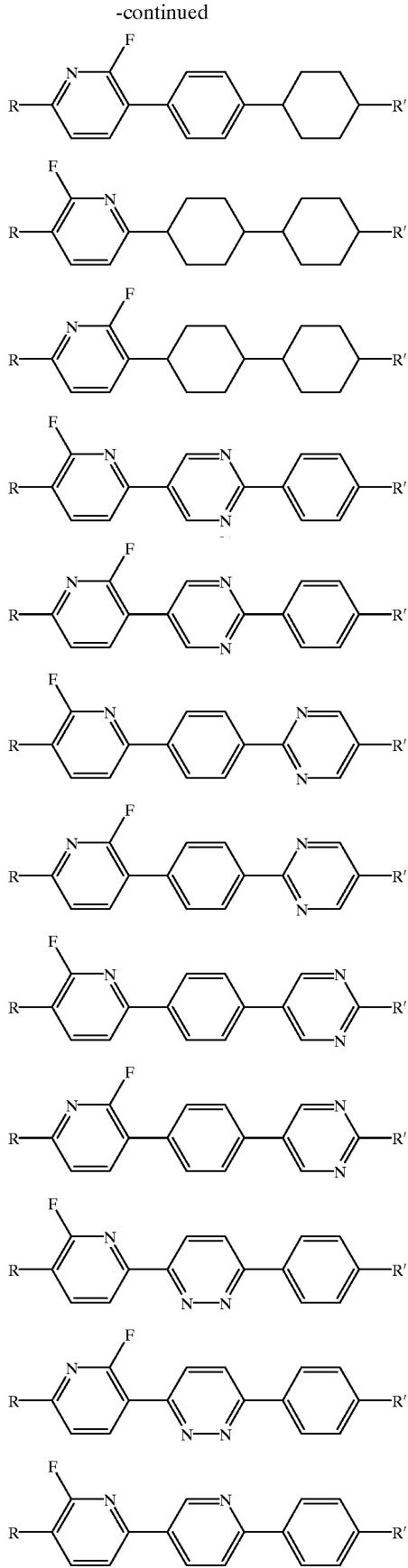

wherein R and R' have the same meanings as $R^1$ and $R^2$ in formula (III).

Further particular preference is given to the compounds of the formula (III) in which $R^1$ and $R^2$ are a straight-chain or branched-chain alkyl group having from 1 to 16 carbon atoms (with or without an asymmetric carbon atom), in which one or two —CH$_2$— groups may also be replaced by —O—, cyclopropane-1,2-diyl or —Si(CH$_3$)$_2$—, with the proviso that oxygen atoms must not be bonded directly to one another; one or more hydrogen atoms of the alkyl group may be substituted by F; $R^1$ or $R^2$ can also be hydrogen, but not both simultaneously.

Very particular preference is given to the following compounds of the formula (III):

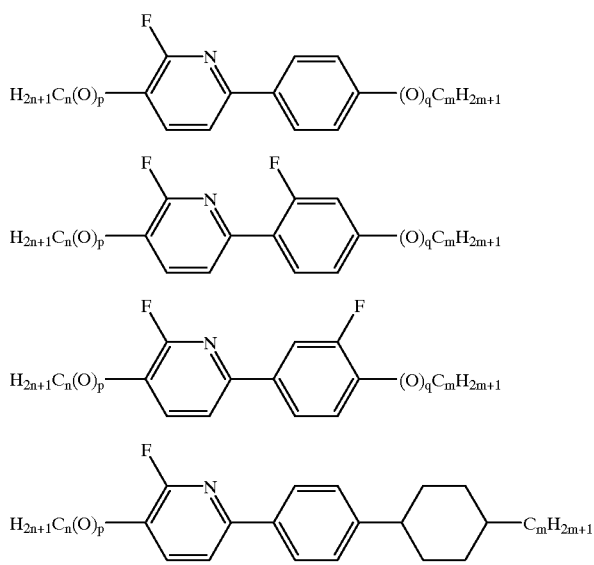

-continued

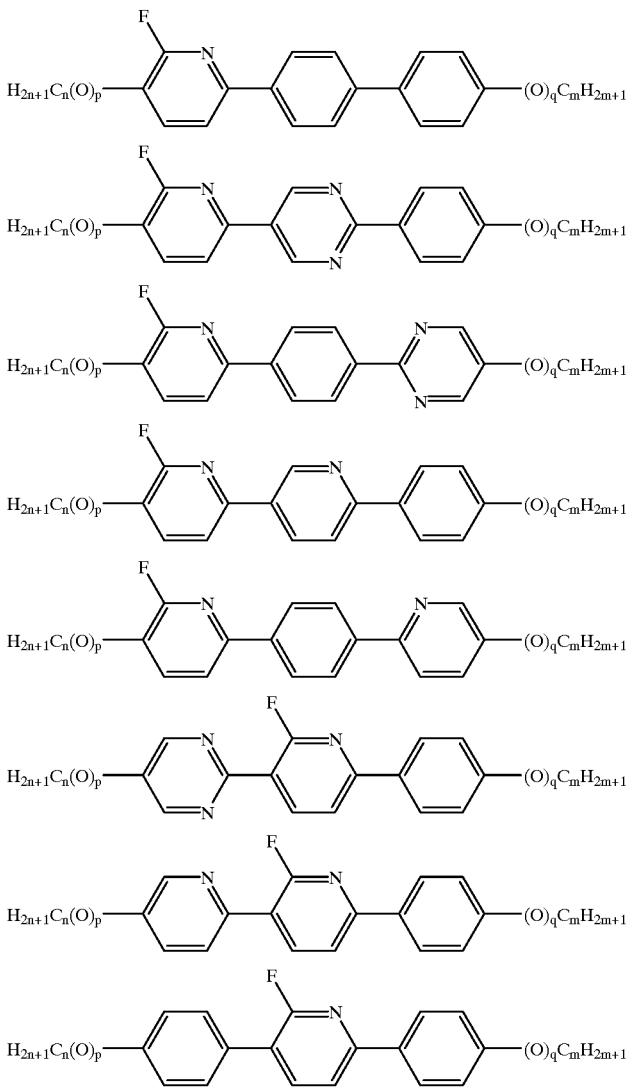

wherein n and m, independently from one another, are 0 to 16 (with the proviso that 3<n+m<29) and q and p, independently from one another, are 0 or 1.

Preferred compounds of group D, i.e., of formula (IV), are those in which the symbols and indices in formula (IV) have the following meanings:

$R^1$ and $R^2$, independently of one another, are
(a) a hydrogen atom,
(b) a straight-chain or branched-chain alkyl group (with or without an asymmetric carbon atom) having from 1 to 16 carbon atoms, in which
b1) one or two non-adjacent and non-terminal —CH$_2$— groups may be replaced by —O—, —CO—O—, —O—CO— or —Si(CH$_3$)$_2$— and/or
b2) one or more hydrogen atoms of the alkyl group may be substituted by F and/or
b3) the terminal CH$_3$-group may be replaced by any one of the following chiral groups (optically active or racemic):

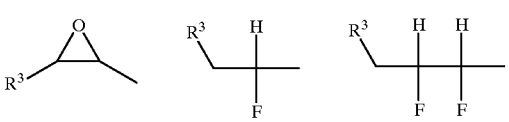

with the proviso that only one of $R^1$, $R^2$ can be a hydrogen atom;

$R^3$, $R^4$, $R^5$, $R^6$, $R^7$, independently of one another, are
a) a hydrogen atom,
b) a straight-chain or branched-chain alkyl group (with or without an asymmetric carbon atom) having from 1 to 12 carbon atoms, where
b1) one non-terminal —CH$_2$— group may be replaced by —O—,
c) $R^4$ and $R^5$ may also together be —(CH$_2$)$_4$— or —(CH$_2$)$_5$— if they are bonded to an oxirane, dioxolane, tetrahydrofuran, tetrahydropyrane, butyrolactone or valerolactone system;

$X^1$ and $X^2$, independently of one another, are selected from hydrogen, CN and F, with the proviso that $X^1$ and $X^2$ are not simultaneously hydrogen; preferably $X^1$ and/or $X^2$ are F;

$M^1$, $M^2$, $M^3$, $M^4$, independently of one another, are —CO—O—, —O—CO—, —CH$_2$—O—, —O—CH$_2$— or a single bond;

$A^1$, $A^2$, $A^3$, $A^4$, independently of one another, are 1,4-phenylene, in which one or two H atoms may be replaced by F, pyridine-2,5-diyl, in which one H atom may be replaced by F, pyrimidine-2,5-diyl or trans-1,4-cyclohexylene.

Examples of particularly preferred compounds of the formula (IV) include:

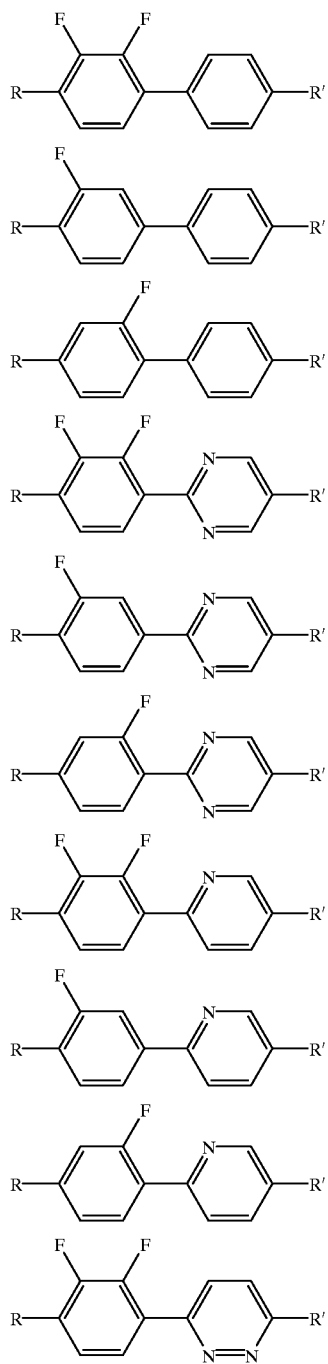

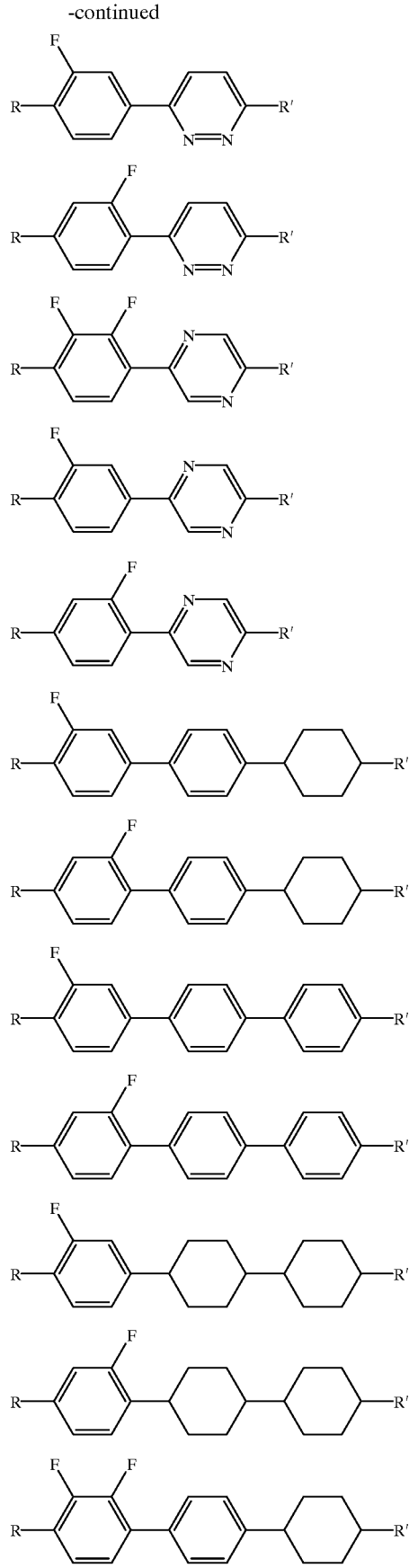

-continued

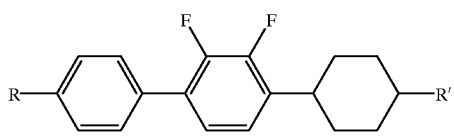
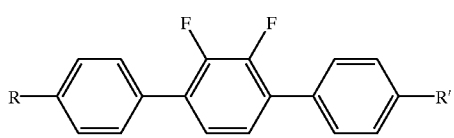
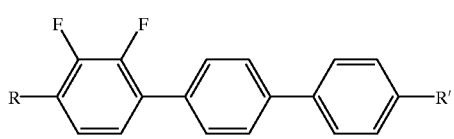
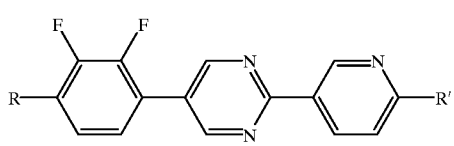
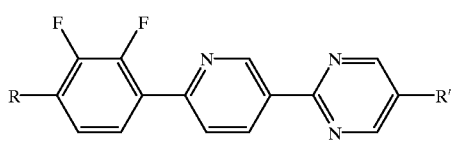
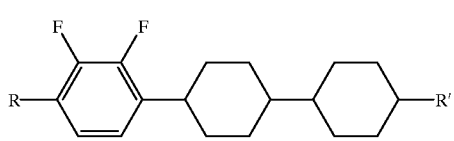
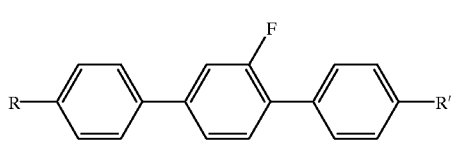
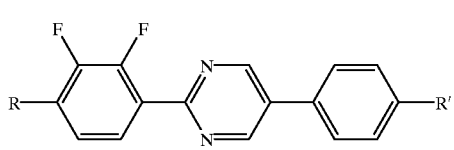
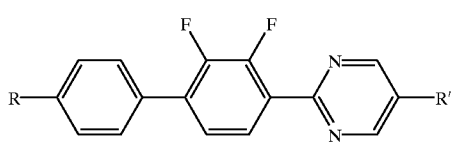

-continued

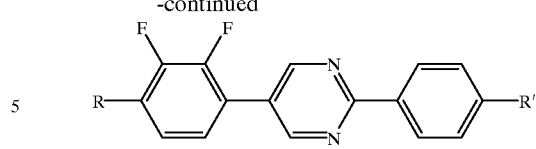
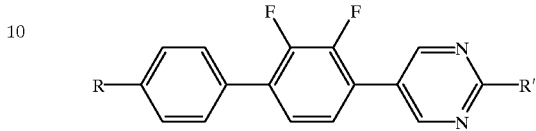
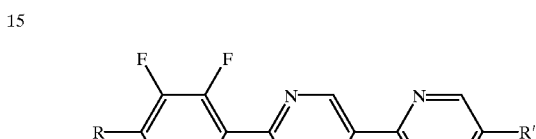
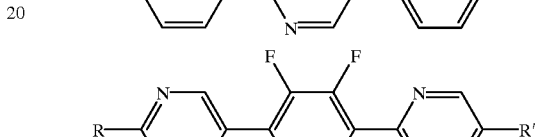
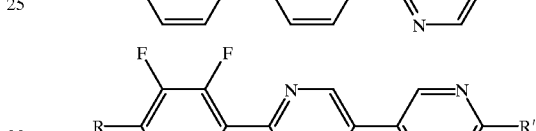
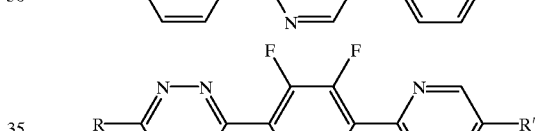
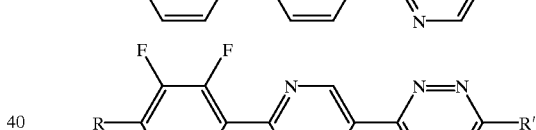
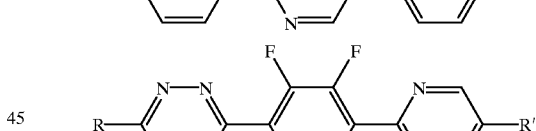

wherein R and R' have the same meaning as $R^1$ and $R^2$ in formula (IV).

Further particular preference is given to the compounds of the formula (IV) in which $R^1$ and $R^2$ are a straight-chain or branched-chain alkyl group having from 1 to 16 carbon atoms (with or without asymmetric carbon atoms), in which one or two —CH$_2$— groups may also be replaced by —O—, cyclopropane-1,2-diyl or —Si(CH$_3$)$_2$—, with the proviso that oxygen atoms must not be bonded directly to one another; one or more hydrogen atoms of the alkyl group may be substituted by F; $R^1$ or $R^2$ can also be hydrogen, but not both simultaneously.

Very particular preference is given to the following compounds of the formula (IV):

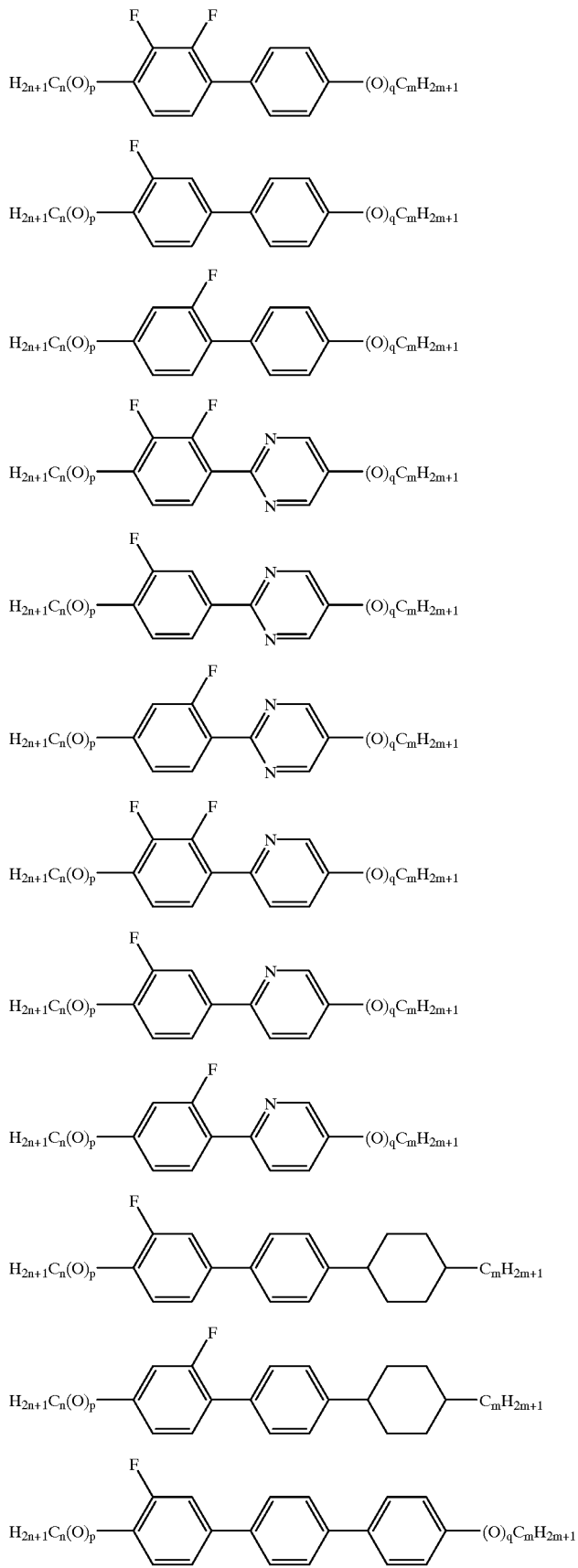

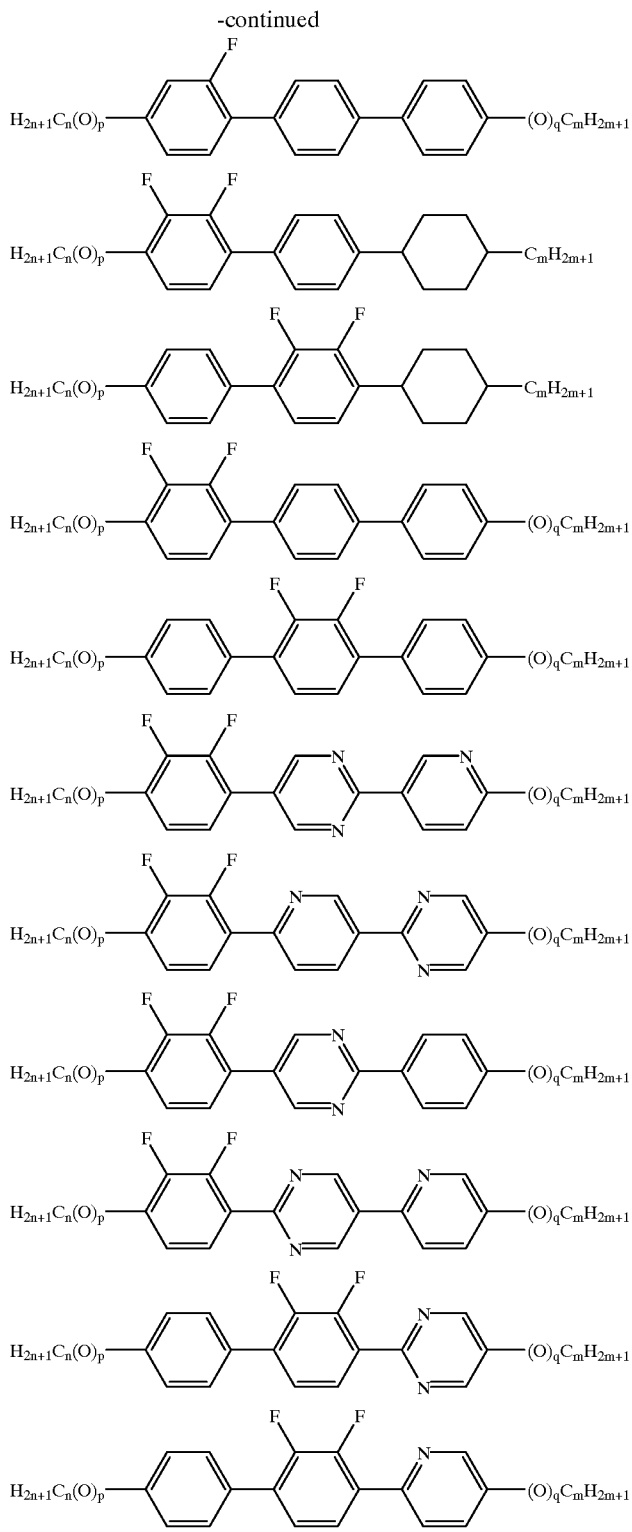

wherein n and m, independently from one another, are 0 to 16 (with the proviso that 3<n+m<29) and q and p, independently from one another, are 0 or 1.

Preferred compounds of group E, i.e. of formula (V), are those, in which the symbols and indices in the formula (V) have the following meanings:

$X^3$ is (a) —F or —$CF_3$, (b) a straight-chain or branched-chain alkyl group (with or without an asymmetric carbon atom) having from 1 to 10 carbon atoms, in which b1) one or two non-adjacent and non-terminal —$CH_2$— groups may be replaced by —O—, —CO—O— or —O—CO— and/or b2) one or more hydrogen atoms of the alkyl group may be substituted by F;

$R^1$ is
(a) a hydrogen atom,
(b) a straight-chain or branched-chain alkyl group (with or without an asymmetric carbon atom) having from 1 to 16 carbon atoms, in which
  b1) one or two non-adjacent and non-terminal —$CH_2$— groups may be replaced by —O—, —CO—O—, —O—CO— or —Si(CH_3)_2— and/or
  b2) one or more hydrogen atoms of the alkyl group may be substituted by F and/or
  b4) the terminal $CH_3$-group may be replaced by any one of the following chiral groups (optically active or racemic):

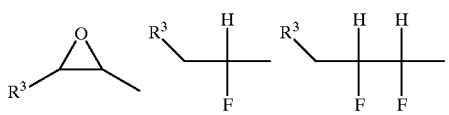

with the proviso that $R^1$ can not be a hydrogen atom if $X^3$ is —F or —$CF_3$;

$R^3$, $R^4$, $R^5$, $R^6$, $R^7$, independently of one another, are
a) a hydrogen atom,
b) a straight-chain or branched-chain alkyl group (with or without an asymmetric carbon atom) having from 1 to 12 carbon atoms, where
  b1) one non-terminal —$CH_2$— group may be replaced by —O—,
c) $R^4$ and $R^5$ may also together be —$(CH_2)_4$— or —$(CH_2)_5$— if they are bonded to an oxirane, dioxolane, tetrahydrofuran, tetrahydropyrane, butyrolactone or valerolactone system;

$M^1$, $M^2$, $M^3$, independently of one another, are
—CO—O—, —O—CO—, —$CH_2$—O—, —O—$CH_2$— or a single bond;

$A^1$, $A^2$, $A^3$, independently of one another, are
1,4-phenylene, in which one or two H atoms may be replaced by F, pyridine-2,5-diyl, in which one H atom may be replaced by F, pyrimidine-2,5-diyl, trans-1,4-cyclohexylene, thiophene-2,5-diyl, [1,3,4]-thiadiazole-2,5-diyl or [1,3]-thiazole-2,5-diyl.

Examples of particularly preferred compounds of the formula (V) include:

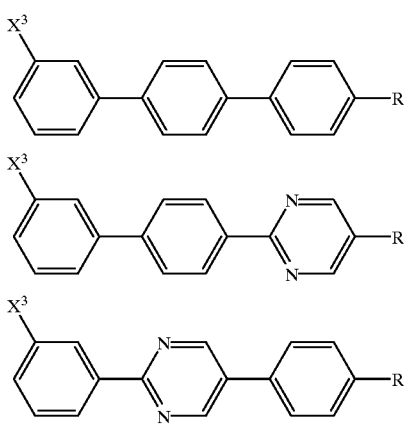

wherein R has the same meaning as $R^1$ in formula (V).

Further particular preference is given to the compounds of the formula (V) in which $R^1$ and $R^2$ are a straight-chain or branched-chain alkyl group having from 1 to 16 carbon atoms (with or without an asymmetric carbon atom), in which one or two —$CH_2$— groups may also be replaced by —O— or —Si(CH_3)_2—, with the proviso that oxygen atoms must not be bonded directly to one another; one or more hydrogen atoms of the alkyl group may be substituted by F.

Preferred are those compounds of group F, in which the symbols and indices in the formula (VI) have the following meanings:

$R^1$ and $R^2$, independently of one another, are
(a) a hydrogen atom,
(b) a straight-chain or branched-chain alkyl group (with or without an asymmetric carbon atom) having from 1 to 16 carbon atoms, in which b1) one or two non-adjacent and non-terminal —CH$_2$— groups may be replaced by —O—, —CO—O—, —O—CO— or —Si(CH$_3$)$_2$— and/or b2) one —CH$_2$— group may be replaced by trans-1,4-cyclohexylene, 1,4-phenylene or cyclopropane-1,2-diyl and/or b3) one or more hydrogen atoms of the alkyl group may be substituted by F and/or b4) the terminal CH$_3$-group may be replaced by any one of the following chiral groups (optically active or racemic):

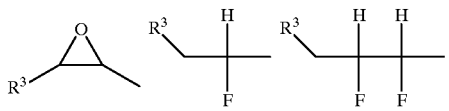

with the proviso that only one of R$^1$, R$^2$ can be a hydrogen atom;

R$^3$, R$^4$, R$^5$, R$^6$, R$^7$, independently of one another, are
a) a hydrogen atom,
b) a straight-chain or branched-chain alkyl group (with or without an asymmetric carbon atom) having from 1 to 12 carbon atoms, where
b1) one non-terminal —CH$_2$— group may be replaced by —O—,
c) R$^4$ and R$^5$ may also together be —(CH$_2$)$_4$— or —(CH$_2$)$_5$— if they are bonded to an oxirane, dioxolane, tetrahydrofuran, tetrahydropyrane, butyrolactone or valerolactone system;

M$^1$, M$^2$, independently of one another, are —CO—O—, —O—CO—, —CH$_2$—O—, —O—CH$_2$— or a single bond;

A$^1$, A$^2$, A$^3$, independently of one another, are 1,4-phenylene, in which one or two H atoms may be replaced by F, pyridine-2,5-diyl, in which one H atom may be replaced by F, pyrimidine-2,5-diyl, trans-1,4-cyclohexylene, thiophene-2,5-diyl, [1,3,4]-thiadiazole-2,5-diyl or [1,3]-thiazole-2,5-diyl.

Examples of particularly preferred compounds of the formula (VI) include:

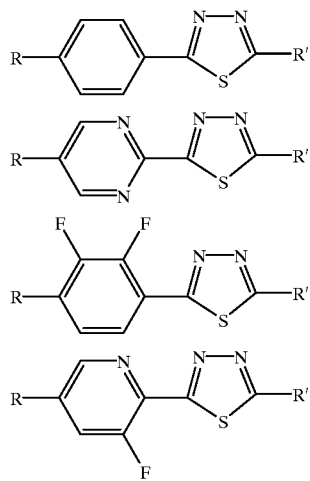

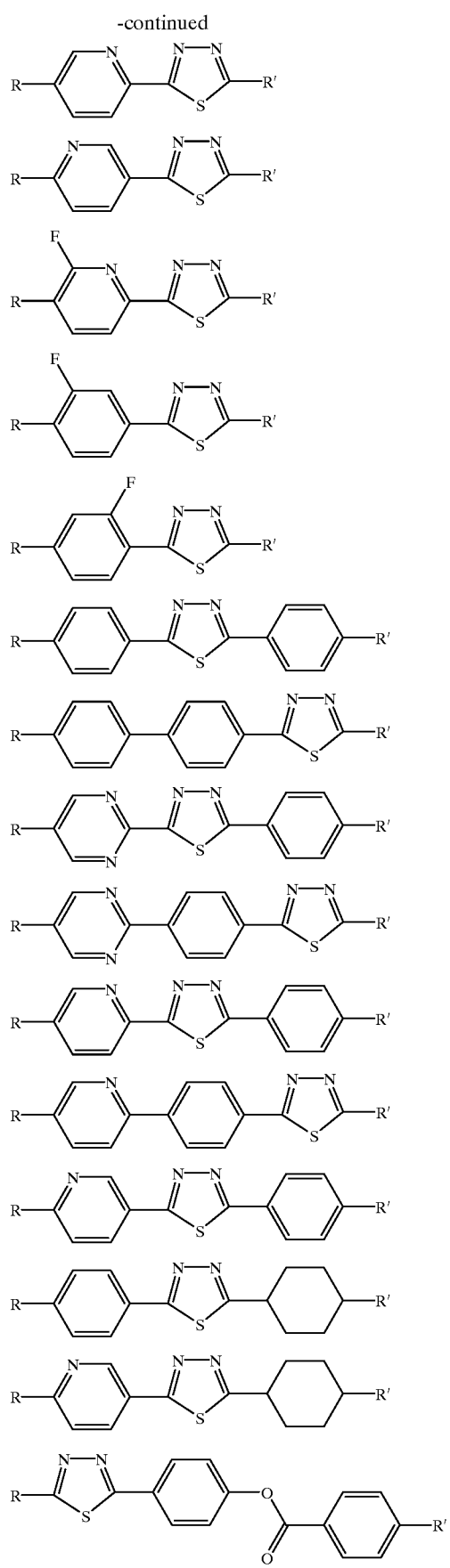

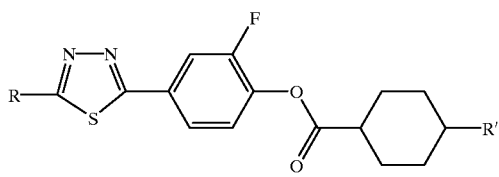

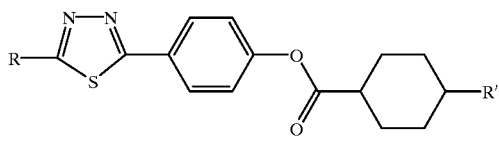

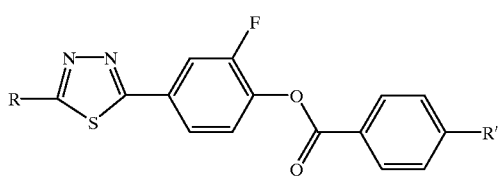

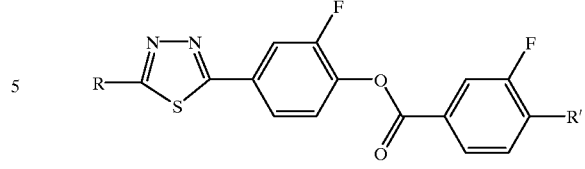

wherein R and R' have the same meaning as $R^1$ and $R^2$ in formula (VI).

Further particular preference is given to the compounds of the formula (VI) in which $R^1$ and $R^2$ are a straight-chain or branched-chain alkyl group having from 1 to 16 carbon atoms (with or without an asymmetric carbon atom), in which one or two —$CH_2$— groups may also be replaced by —O—, cyclopropane-1,2-diyl or —$Si(CH_3)_2$—, with the proviso that oxygen atoms must not be bonded directly to one another; one or more hydrogen atoms of the alkyl group may be substituted by F; $R^1$ or $R^2$ can also be hydrogen, but not both simultaneously.

Very particular preference is given to the following compounds of the formula (VI):

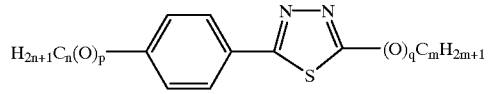

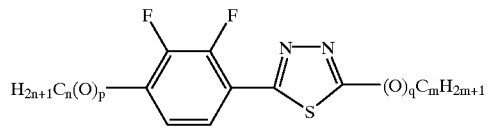

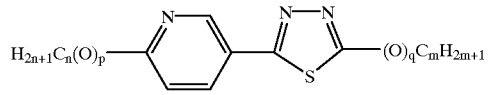

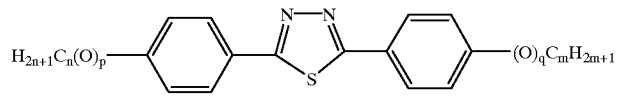

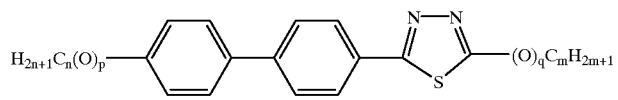

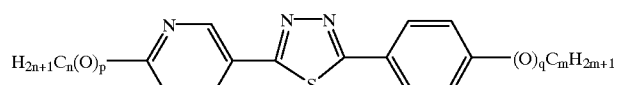

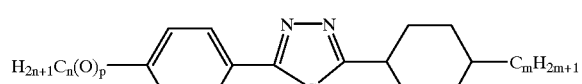

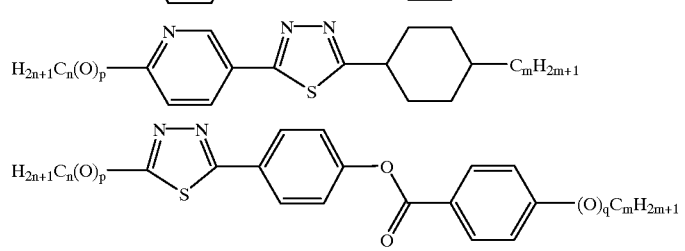

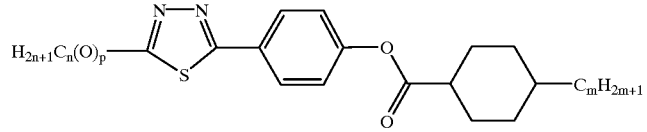

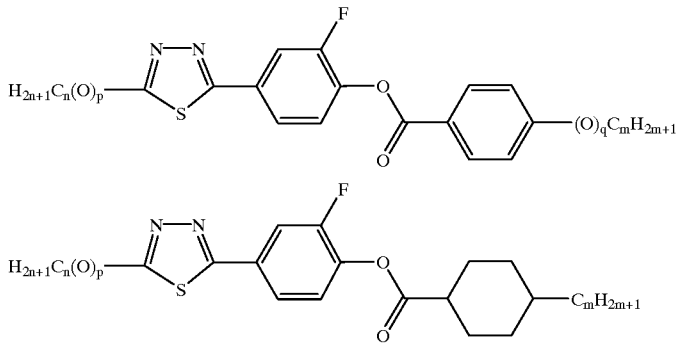

wherein n and m, independently from one another, are 0 to 16 (with the proviso that 3<n+m<29); and q and p, independently from one another, are 0 or 1.

Preferred are those compounds of group G, in which the symbols and indices in the formula (VII) have the following meanings:

$R^1$ is
(a) a hydrogen atom,
(b) a straight-chain or branched-chain alkyl group (with or without an asymmetric carbon atom) having from 1 to 16 carbon atoms, in which
b1) one or two non-adjacent and non-terminal —CH$_2$— groups may be replaced by —O—, —CO—O—, —O—CO— or —Si(CH$_3$)$_2$— and/or
b2) one —CH$_2$— group may be replaced by trans-1,4-cyclohexylene, 1,4-phenylene or cyclopropane-1,2-diyl and/or
b3) one or more hydrogen atoms of the alkyl group may be substituted by F and/or
b4) the terminal CH$_3$-group may be replaced by any one of the following chiral groups (optically active or racemic):

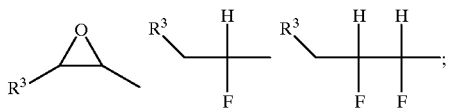

$R^2$ is
(a) a hydrogen atom,
b) a straight-chain or branched-chain alkyl group (with or without an asymmetric carbon atom) having from 1 to 14 carbon atoms, in which
b1) one or two non-adjacent and non-terminal —CH$_2$— groups may be replaced by —O—, —CO—O—, —O—CO— or —Si(CH$_3$)$_2$— and/or
b2) one or more hydrogen atoms of the alkyl group may be substituted by F;

$R^3$, $R^4$, $R^5$, $R^6$, $R^7$, independently of one another, are
a) a hydrogen atom,
b) a straight-chain or branched-chain alkyl group (with or without an asymmetric carbon atom) having from 1 to 12 carbon atoms, where
b1) one non-terminal —CH$_2$— group may be replaced by —O—,
c) $R^4$ and $R^5$ may also together be —(CH$_2$)$_4$— or —(CH$_2$)$_5$— if they are bonded to an oxirane, dioxolane, tetrahydrofuran, tetrahydropyrane, butyrolactone or valerolactone system;

$M^1$, $M^2$, independently of one another, are —CO—O—, —O—CO—, —CH$_2$—O—, —O—CH$_2$— or a single bond;

$A^1$, $A^2$, independently of one another, are 1,4-phenylene, in which one or two H atoms may be replaced by F, pyridine-2,5-diyl, in which one H atom may be replaced by F, pyrimidine-2,5-diyl, 1,4-cyclohexylene, thiophene-2,5-diyl, [1,3,4]-thiadiazole-2,5-diyl or [1,3]-thiazole-2,5-diyl.

Examples of particularly preferred compounds of the formula (VII) include:

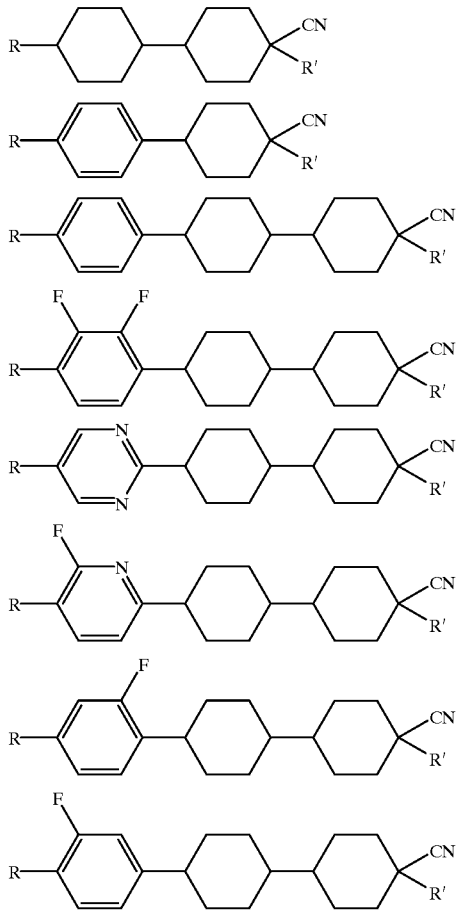

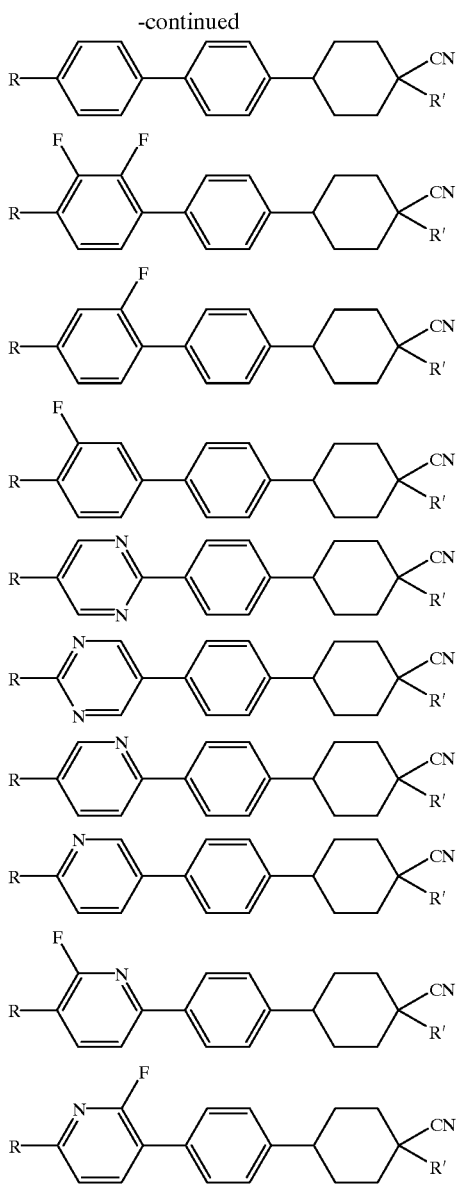

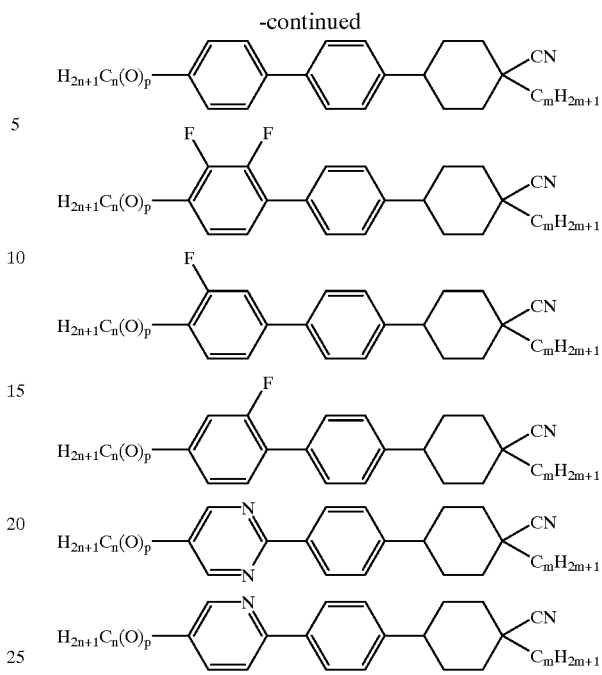

wherein R and R' have the same meanings as $R^1$ and $R^2$ in formula (VII).

Further particular preference is given to the compounds of the formula (VII) in which $R^1$ and $R^2$ are a straight-chain or branched-chain alkyl group having from 1 to 16 carbon atoms (with or without asymmetric carbon atoms), in which one or two —$CH_2$— groups may also be replaced by —O—, cyclopropane-1,2-diyl or —$Si(CH_3)_2$—, with the proviso that oxygen atoms must not be bonded directly to one another; one or more hydrogen atoms of the alkyl group may be substituted by F; $R^1$ or $R^2$ can also be hydrogen, but not both simultaneously.

Very particular preference is given to the following compounds of the formula (VII):

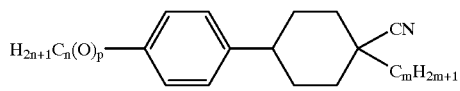

wherein n and m, independently from one another, are 0 to 16 (with the proviso that 3<n+m<29); p is 0 or 1.

The compounds of groups A to G are either known or can be prepared in a manner known per se, analogously to known compounds.

The compounds and synthesis thereof are described, e.g., in:

DE-A 195 22 145, DE-A 195 22 152, DE-A 195 22 167, DE-A-195 22 175 and DE-A 195 22 195 (component A);
DE-A 195 00 768 (equivalent to U.S. Pat. No. 5,648,021) (component B);
U.S. Pat. No. 5,389,291 and WO-A 92/11 241 (component C);
EP-A 0 332 024 (equivalent to U.S. Pat. No. 4,914,380) and J. Chem. Soc. Perkin Trans. II 1989, 2041 (component D);
EP-A 0 578 054 (equivalent to U.S. Pat. No. 5,447,656 (component E);
EP-A 0 309 514 (equivalent to U.S. Pat. No. 5,478,496) and DE-A 37 03 651 (component F); and
EP-A 0 233 267 (equivalent to U.S. Pat. No. 4,886,620 and U.S. Pat. No. 5,075,032) (component G);

all of which are incorporated herein by reference.

The liquid crystal mixtures according to the invention are prepared in a manner which is customary per se. As a rule the components are dissolved in one another, advantageously at elevated temperatures.

As stated above the ferroelectric liquid crystal mixture according to the invention comprises one or more compounds from group A and one or more compounds from groups B to G.

Preferably the mixture comprises 2 to 35, more preferably 2 to 30 and in particular 3 to 25 and especially 4 to 20 compounds of groups A to G.

Preferably the mixture's content of compounds of groups A to G is 5% by weight or more, more preferably 10% or more, particularly 15% or more.

In a preferred embodiment the mixture according to the invention comprises compounds from 2, 3 or 4 different groups B to G.

In a preferred embodiment the mixture according to the invention comprises at least one compound from each group:

| a) A + B | b) A + C | c) A + D |
|---|---|---|
| d) A + E | e) A + F | f) A + G |

In a further preferred embodiment the mixture according to the invention includes one or more compounds from group A, one or more compounds from group B and one or more compounds from groups C, D, E, F or G.

In a further preferred embodiment the mixture according to the invention includes one or more compounds from group A, one or more compounds from group C and one or more compounds from groups B, D, E, F or G.

In a further preferred embodiment the mixture according to the invention includes one or more compounds from group A, one or more compounds from group D and one or more compounds from groups B, C, E, F or G.

In a further preferred embodiment the mixture according to the invention includes one or more compounds from group A, one or more compounds from group E and one or more compounds from groups B, C, D, F or G.

In a further preferred embodiment the mixture according to the invention includes one or more compounds from group A, one or more compounds from group F and one or more compounds from groups B, C, D, E or G.

In a further preferred embodiment the mixture according to the invention includes one or more compounds from group A, one or more compounds from group G and one or more compounds from groups B, C, D, E or F.

In a further preferred embodiment the mixture according to the invention comprises 3 or more compounds from each group:

| a) | A + B + C | b) | A + B + D | c) | A + B + E | d) | A + B + F |
|---|---|---|---|---|---|---|---|
| e) | A + B + G | f) | A + C + D | g) | A + C + E | h) | A + C + F |
| i) | A + C + G | j) | A + D + E | k) | A + D + F | l) | A + D + |
| m) | A + E + F | n) | A + E + G | o) | A + F + G. | | G |

In a further preferred embodiment the mixture according to the invention comprises 4 or more compounds from each group:

| a) | A + B + C + D | b) | A + B + C + E | c) | A + B + C + F |
|---|---|---|---|---|---|
| d) | A + B + C + G | e) | A + B + D + E | f) | A + B + D + F |
| g) | A + B + D + G | h) | A + B + E + F | i) | A + B + E + G |
| j) | A + B + F + G | k) | A + C + D + E | l) | A + C + D + F |
| m) | A + C + D + G | n) | A + C + E + F | o) | A + C + E + G |
| p) | A + C + F + G | q) | A + D + E + F | r) | A + D + E + G |
| s) | A + D + F + G | t) | A + E + F + G. | | |

The liquid crystal mixtures according to the invention generally consists of 2 to 35, preferably from 2 to 30, particularly preferably from 3 to 25 compounds.

Since the mixture according to the invention is ferroelectric it must contain at least one optically active compound. Generally the mixture contains one or more optically non-active compounds (base mixture) and one or more optically active compounds (chiral dopants).

Further suitable components for the liquid crystal mixtures according to the invention include, for example:

derivatives of phenylpyrimidine, as described, for example, in WO 86/06401 and U.S. Pat. No. 4,874,542, silicon compounds, as described, for example, in EP-A 0 355 008, mesogenic compounds containing only one side chain as described, for example, in EP-A 0 541 081, hydroquinone derivatives, as described, for example, in EP-A 0 603 786, pyridylpyrimidines, as described, for example, in WO 92/12974, phenylbenzoates, as described, for example, in P. Keller, Ferroelectrics 58 (1984), 3, and J. W. Goodby et al., Liquid Crystals and Ordered Fluids, Vol. 4, New York, 1984, thiazoles, as described, for example, in EP-A 0 430 170, fluorinated compounds, especially terphenyles, as described, for example, in EP-A 0 132 377, 4-cyano-cyclohexyl derivatives, as described, for example, in EP-A 0 233 267, 2-fluoro-pyrazines, as described, for example in EP-A 0 532 916, indane compounds, as described, for example in EP-A 0 546 338 and EP-A 0 647 695, quinoxaline compounds, as described, for example in EP-A 0 604 921 and EP-A 0 622 359, naphthalene compounds, as described, for example, in DE-A 42 40 041, and thiophene compounds, as described, for example in EP-A 0 400 072.

Examples of suitable chiral, non-racemic dopants include:

optically active phenylbenzoates, as described, for example, in P. Keller, Ferroelectrics 58 (1984), 3, and J. W. Goodby et al., Liquid Crystals and Ordered Fluids, Vol. 4, New York, 1984, optically active oxirane ethers, as described, for example, in EP-A 0 263 437 and WO-A 93/13093, optically active oxirane esters, as described, for example, in EP-A 0 292 954, optically active dioxolane ethers, as described, for example, in EP-A 0 351 746, optically active dioxolane esters, as described, for example, in EP-A 0 361 272, optically active tetrahydrofuran-2-carboxylic esters, as described, for example, in EP-A 0 355 561, optically active 2-fluoroalkyl ethers, as described, for example, in EP-A 0 237 007 and U.S. Pat. No. 5,051,506, and optically active 4-cyano-cyclohexyl compounds, as described, for example, in EP-A 0 428 720.

Preferred additional compounds are one or more phenylpyrimidine compounds of the formula (VIII):

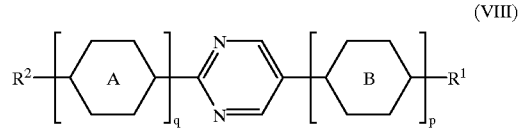

(VIII)

wherein $R_1$ and $R_2$ are as defined under formula (I);

rings A and B, independently of one another, are 1,4-phenylene or 1,4-cyclohexylene;

q and p are 0, 1 or 2, with the proviso that $0<q+p\leq2$; if q or p is 2 then the A or B groups can be different.

Examples of particularly preferred compounds of the formula (VIII) include:

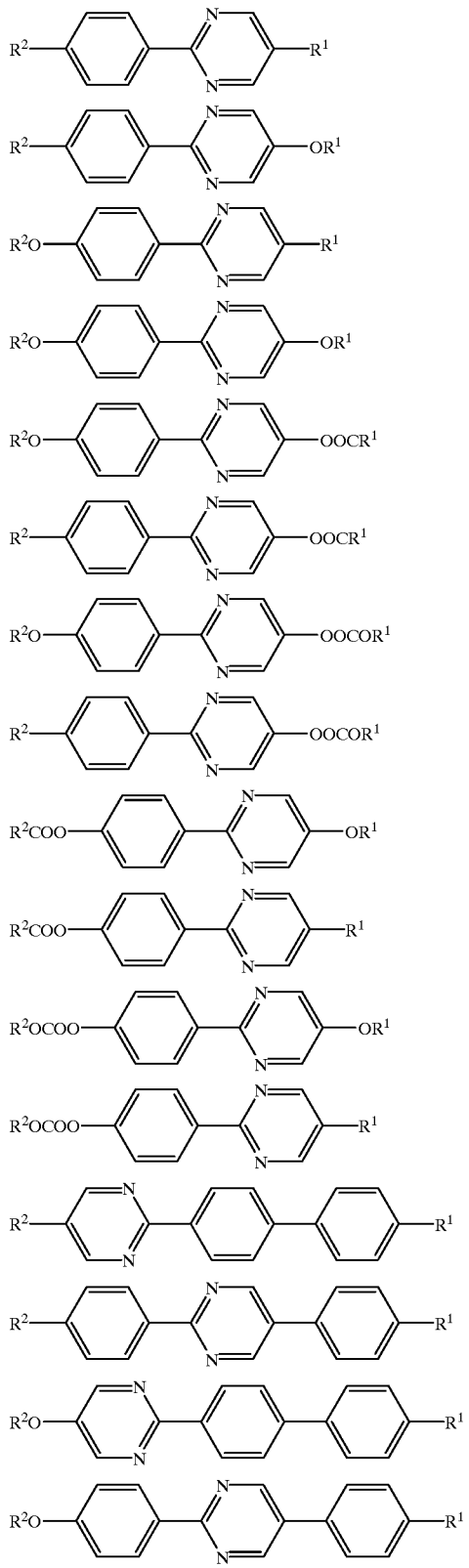

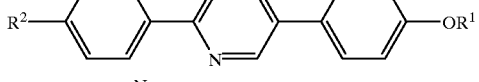
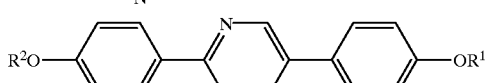
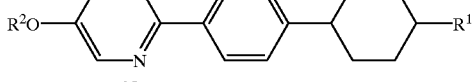
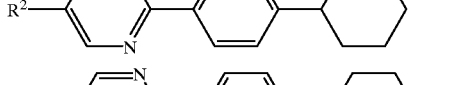
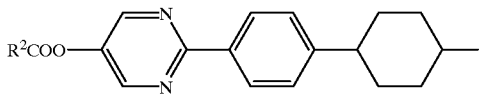
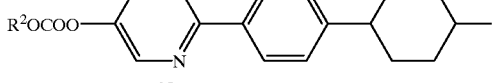
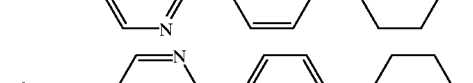

wherein $R^1$ and $R^2$, independently of each other, are alkyl groups having from 0 to 16 carbon atoms where one or two hydrogen atoms of the alkyl groups may be substituted by F; $R^1$ or $R^2$ can also be hydrogen, but not both simultaneously.

It is preferable that the liquid crystal mixture of the present invention has a negative $\Delta\epsilon$. It is further preferable that the absolute value thereof is 2 or above, particularly 4 or above, at a temperatur in the working range of the display, preferably at a temperature in the range between 10° C. and 40° C., particularly preferred at 25° C.

It is preferable that the liquid crystal mixture employed in the ferroelectric liquid crystal display device has a phase sequence of I-N*-$S_A$-$S_C$* (with decreasing temperature), a sufficiently broad N* phase and a broad $S_A$ phase, and sufficiently long helical pitches in the N* and $S_C$* phases, (preferably at least five times, more preferred ten times, the layer thickness of the FLC-layer) since good alignment characteristics can thus be achieved. (I stands for the isotropic phase, N* stands for the chiral nematic phase, $S_A$ stands for the smectic A phase, and $S_C$* stands for the chiral smectic C phase.) In particular, the smectic A phase and the nematic phase should have a temperature range of at least 1° C. without two phases coexisting, preferably 3° C. or more, more preferred 5° C. or more.

Use of the compounds of groups A to G, optionally together with the compounds of the general formula (VIII), in accordance with the present invention allows enlargement of the absolute value of the negative $\Delta\epsilon$ of ferroelectric liquid crystals. In the conventional methods, the spontaneous polarization value of liquid crystals is selected to be sufficiently low so as to give a low driving voltage. However, the present invention makes it possible to improve the response speed by increasing the spontaneous polarization value without elevating the driving voltage. In the present invention, the spontaneous polarization value ranges preferably from 1 to 30 $nC/cm^2$, particularly preferably from 5 to 20 $nC/cm^2$.

With an increase in spontaneous polarization value, it is sometimes observed that sufficiently enough contrast cannot be obtained due to sticking or insufficient memory properties. It is, therefore, preferable that the ferroelectric liquid crystal mixture of the present invention contains at least one compound as described, e.g., in EP-A 0 502 964, EP-A 0 385 688 or WO-A 93/04142. These documents are hereby incorporated by reference.

Examples of these compounds include, in particular, ethylene glycol dimethyl ether and triethylene glycol dimethyl ether, and crown ethers (for example, 12-crown4, 15-crown-5, 18-crown-6, etc.) and derivatives thereof.

It is preferable that the liquid crystal mixture according to the invention contains from 0.01 to 5% by weight, particularly from 0.1 to 2% of the above compounds.

It is also preferable that the pretilt angle of liquid crystal molecules at the interface between the liquid crystal and the alignment layer is 10° or less, preferably 0.1° to 8°.

In a preferred embodiment the mixtures according to the invention show a ratio $\Theta_{(5V)}/\Theta_{(0V)}$ of 1.4 or more preferably 1.8 or more, particularly preferably 2.0 or more. By adding suitable further components known to someone skilled in the art, e.g. such as dopants described in Y. Aoki and H. Nohira, Ferroelectrics 1996, 178, 213–220, mixtures can be obtained that show anti-ferroelectric properties.

The mixtures according to the invention can be used in electro-optical or fully optical elements, for example display elements, switching elements, light modulators, elements for image processing and/or signal processing or generally in the area of nonlinear optics.

Ferroelectric liquid crystal mixtures according to the invention are particularly suitable for use in electro-optical switching and display devices (displays). These displays are usually constructed in such a way that a liquid crystal layer is enclosed on both sides by layers which are usually, in this sequence starting from the LC layer, at least one alignment layer, electrodes and a limiting sheet (for example of glass). In addition, they contain spacers, adhesive frames, polarizers and, for color displays, thin color-filter layers. Other possible components are antireflection, passivation, compensation and barrier layers and electric non-linear elements, such as thin-film transistors (TFTs) and metal-insulator-metal (MIM) elements. The structure of liquid crystal displays has already been described in detail in relevant monographs (see, for example, E. Kaneko, "Liquid Crystal TV Displays: Principles and Applications of Liquid Crystal Displays", KTK Scientific Publishers 1987).

They are especially useful for applications in the inverse or $\tau$-$V_{(min)}$ mode.

The present invention further provides a ferroelectric liquid crystal (FLC) display device comprising the above-mentioned liquid crystal mixture of the present invention between a pair of substrates each comprising an electrode and an alignment layer formed thereon.

In a preferred embodiment the FLC display is operated in the inverse mode.

Several documents are cited in this application, e.g. to discuss the state of the art, synthesis of compounds used in the present invention or application of the mixtures according to the invention. All these documents are hereby incorporated by reference.

Cell Fabrication

A solution of LQT 120 (Hitachi Kasei) is applied onto glass substrates with ITO by spin coating at 2500 rpm. The substrates are heated at 200° C. for 1 hour to form a film. After rubbing the coated film with a nylon cloth in one direction, the substrates are assembled into a cell with spacers having a thickness of 2.0 $\mu$m inserted between the substrates in such a manner that the rubbing directions are parallel to each other. The properties of the liquid crystal mixture is measured using the resulting cell. The voltage ($V_{min}$), which gives a minimum value ($\tau_{min}$) of the pulse width ($\tau$) in the $\tau$-V characteristics of a ferroelectric liquid crystal device, is measured by filling the liquid crystal mixture into the cell in an isotropic phase, cooling progressively through the nematic, smectic A and the smectic C phase and then applying a monopolar pulse to the cell at 25° C.

Phase transition temperatures were determined by optical polarizing microscopy and DTA.

The dielectric anisotropy ($\Delta\epsilon$) is measured by filling the liquid crystal mixture into a homotropic orientation cell and a planar orientation cell (EHC, with a cell gap of 10 $\mu$m) and applying an electric field of 1V, 20 KHz to the cells at 25° C. The value for homotropic alignment is corrected for the tilt angle.

Spontaneous Polarization $P_s$

The Diamant bridge (or Sawver-Tower) method (H. Diamant, K. Prenck and R. Pepinsky, Rev. Sci. Instr. 28, 30 (1957)) is used to determine $P_s$. The test cells have a thickness of 5 $\mu$m and are thinly coated with ITO.

$2\Theta_{(5V)}$ was measured by optical inspection of two memory states under applying a high frequency rectangular pulse. The voltage of the rectangular pulse from peak to peak is 10 V.

What is claimed is:

1. A chiral non-racemic tilted smectic liquid crystal mixture comprising a compound of group A:

A. substituted 1,2-difluornaphthaline derivatives of the formula (I),

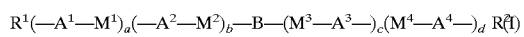

wherein the symbols and indices have the following meanings:

B is

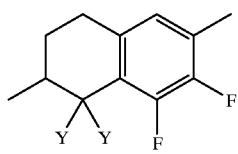

or

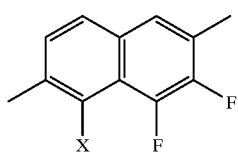

$R^1$ and $R^2$, independently of one another, are
(a) a hydrogen atom, —F, —Cl, —CN, —$CF_3$ or —$OCF_3$,
(b) a straight-chain or branched-chain alkyl group, with or without asymmetric carbon atoms, having from 1 to 20 carbon atoms, in which
b1) one or more non-adjacent and non-terminal —$CH_2$— groups may be replaced by —O—, —S—, —CO—, —CO—O—, —O—CO—, —O—CO—O— or —$Si(CH_3)_2$— and/or
b2) one or more —$CH_2$— groups may be replaced by —CH=CH—, —C≡C—, 1,4-cyclohexylene, 1,4-phenylene, cyclopropane-1,2-diyl or 1,3-cyclopentylene and/or
b3) one or more hydrogen atoms of the alkyl group may be substituted by F and/or Cl and/or
b4) the terminal $CH_3$-group may be replaced by any one of the following chiral groups (optically active or racemic):

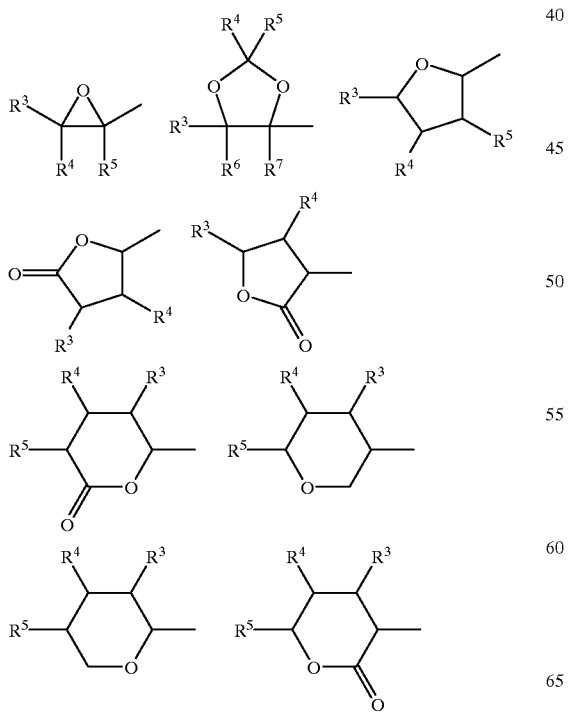

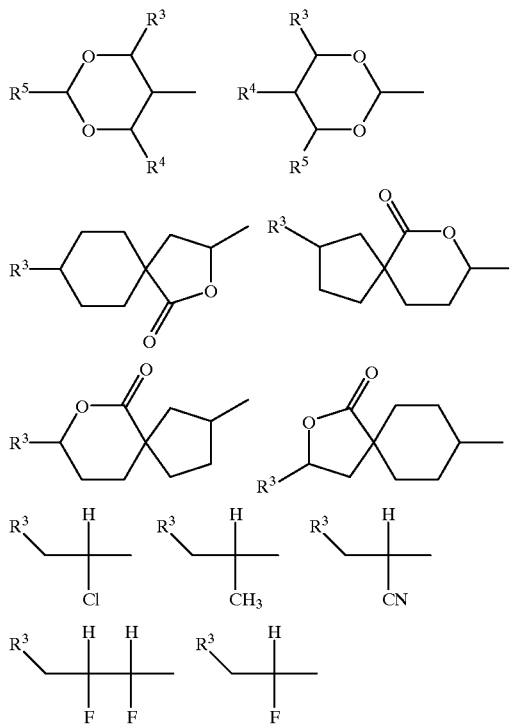

with the proviso that only one of $R^1$, $R^2$ can be a hydrogen atom, —F, —Cl, —CN, —$CF_3$ or —$OCF_3$;

$R^3$, $R^4$, $R^5$, $R^6$, $R^7$, independently of one another, are
a) a hydrogen atom,
b) a straight-chain or branched-chain alkyl group (with or without asymmetric carbon atoms) having from 1 to 16 carbon atoms, where
b1) one or more non-adjacent and non-terminal —$CH_2$— groups may be replaced by —O— and/or
b2) one or two —$CH_2$— groups may be replaced by —CH=CH— and/or
b3) one or more hydrogen atoms of the alkyl group may be substituted by F or Cl,
c) $R^4$ and $R^5$ may also together be —$(CH_2)_4$— or —$(CH_2)_5$— if they are bonded to an oxirane, dioxolane, tetrahydrofuran, tetrahydropyrane, butyrolactone or valerolactone system;

$M^1$, $M^2$, $M^3$, $M^4$, independently of one another, are —CO—O—, —O—CO—, —$CH_2$—O—, —O—$CH_2$—, —$CH_2$—$CH_2$—, —CH=CH—, —C≡C—, —$CH_2$—$CH_2$—CO—O—, —O—CO—$CH_2$—$CH_2$— or a single bond;

$A^1$, $A^2$, $A^3$, $A^4$, independently of one another, are 1,4-phenylene, in which one or more H atoms may be replaced by F, Cl and/or CN, pyridine-2,5-diyl, in which one H atom may be replaced by F, pyrimidine-2,5-diyl, pyrazine-2,5-diyl, in which one H atom may be replaced by F, pyridazin-3,6-diyl, in which one H atom may be replaced by F, 1,4-cyclohexylene, in which one or two hydrogen atoms may be substituted by CN and/or F and/or $CH_3$, thiophene-2,5-diyl, in which one or two H atoms may be replaced by F, [1,3,4]-thiadiazole-2,5-diyl, [1,3]-thiazole-2,4-diyl, in which one H atom may be replaced by F, [1,3]-thiazole-2,5-diyl, in which one H atom may be replaced by F, or 1,3-dioxane-2,5-diyl;

X is H or F and Y are both H, F or together O;

a, b, c, d are 0 or 1 with the proviso, that compounds of the formula (I) may not contain more than four five- or six-membered ring systems;

and a further compound of any of the groups B to G:

B. phenanthrene derivatives of the formula (II)

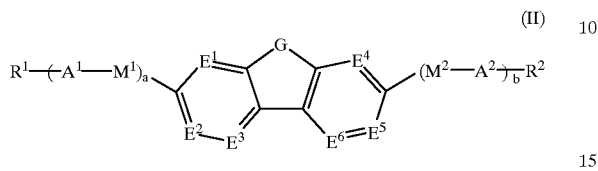

(II)

in which the symbols and indices have the following meanings:

$E^1$, $E^2$, $E^3$, $E^4$, $E^5$ and $E^6$ are —N—, —CF— or —CH—, with the following provisos:

if $E^1$ ($E^4$) is —N— or —CF—, $E^2$ and $E^3$ ($E^5$ and $E^6$) must be —CH—;

if $E^2$ and/or $E^3$ ($E^6$ and/or $E^6$) are —CF—, $E^1$ ($E^4$) must be —CH—;

if $E^2$ ($E^5$) is —N—, $E^1$ ($E^4$) must be —CH—, while $E^3$ ($E^6$) can be —CH— or —CF—;

and at least one of $E^1$ to $E^6$ must be —N— or —CF—;

G is —CH$_2$CH$_2$— or —CH=CH—;

$R^1$ and $R^2$, independently of one another, are
  (a) a hydrogen atom, —F, —Cl, —CN, —CF$_3$ or —OCF$_3$,
  (b) a straight-chain or branched-chain alkyl group (with or without an asymmetric carbon atom) having from 1 to 20 carbon atoms, in which
    b1) one or more non-adjacent and non-terminal —CH$_2$— groups may be replaced by —O—, —S—, —CO—, —CO—O—, —O—CO—, —O—CO—O— or —Si(CH$_3$)$_2$— and/or
    b2) one or more —CH$_2$— groups may be replaced by —CH=CH—, —C≡C—, 1,4-cyclohexylene, 1,4-phenylene, cyclopropane-1,2-diyl or 1,3-cyclopentylene and/or
    b3) one or more hydrogen atoms of the alkyl group may be substituted by F and/or Cl and/or
    b4) the terminal CH$_3$-group may be replaced by any one of the following chiral groups (optically active or racemic):

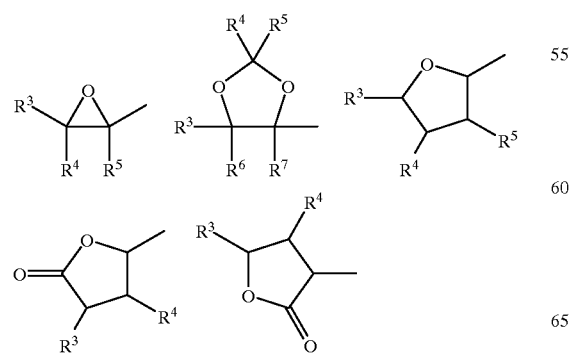

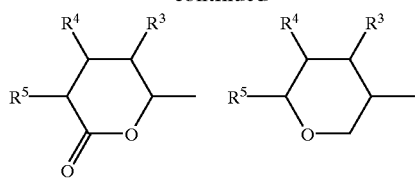

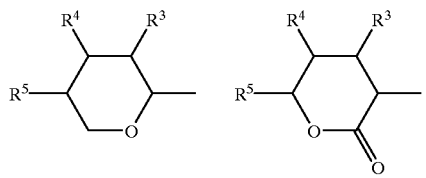

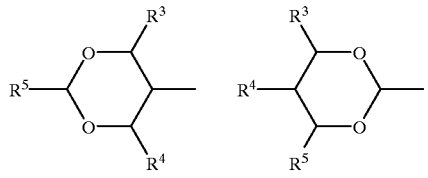

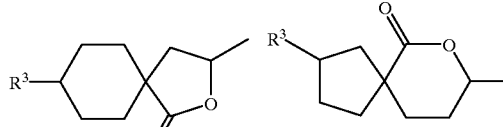

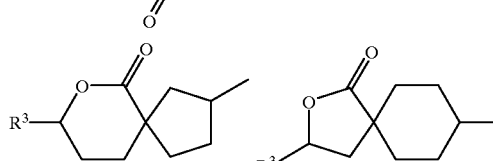

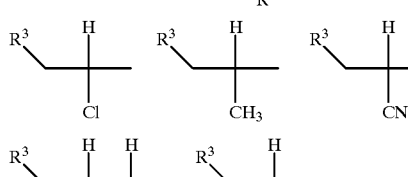

with the proviso that only one of $R^1$, $R^2$ can be a hydrogen atom, —F, —Cl, —CN, —CF$_3$ or —OCF$_3$;

$R^3$, $R^4$, $R^5$, $R^6$, $R^7$, independently of one another, are
  a) a hydrogen atom,
  b) a straight-chain or branched-chain alkyl group (with or without an asymmetric carbon atom) having from 1 to 16 carbon atoms, where
    b1) one or more non-adjacent and non-terminal —CH$_2$— groups may be replaced by —O— and/or
    b2) one or two —CH$_2$— groups may be replaced by —CH=CH— and/or
    b3) one or more hydrogen atoms of the alkyl group may be substituted by F or Cl,
  c) $R^4$ and $R^5$ may also together be —(CH$_2$)$_4$— or —(CH$_2$)$_5$— if they are bonded to an oxirane, dioxolane, tetrahydrofuran, tetrahydropyrane, butyrolactone or valerolactone system;

$M^1$, $M^2$, independently of one another, are —CO—O—, —O—CO—, —CH$_2$—O—, —O—CH$_2$—, —CH$_2$—CH$_2$—, —CH=CH—, —C≡C—, —CH$_2$—CH$_2$—CO—O—, —O—CO—CH$_2$—CH$_2$— or a single bond;

$A^1$, $A^2$, independently of one another, are 1,4-phenylene, in which one or more H atoms may be replaced by F, Cl and/or CN, pyridine-2,5-diyl, in which one H atom may be replaced by F, pyrimidine-2,5-diyl, pyrazine-2,5-diyl, in which one H atom may be replaced by F, pyridazin-3,6-diyl, in which one H atom may be replaced by F, 1,4-cyclohexylene in which one or two hydrogen atoms may be substituted by CN and/or F and/or $CH_3$, thiophene-2,5-diyl, [1,3,4]-thiadiazole-2,5-diyl, [1,3]-thiazole-2,4-diyl, [1,3]-thiazole-2,5-diyl or 1,3-dioxane-2,5-diyl;

a, b are 0 or 1 with the proviso, that compounds of the formula (II) may not contain more than three five- or six-membered ring systems;

C. 2-fluoropyridine derivatives of the formula (III),

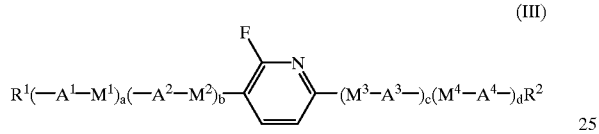
(III)

in which the symbols and indices have the following meanings:

$R^1$ and $R^2$, independently of one another, are
(a) a hydrogen atom, —F, —Cl, —CN, —$CF_3$ or —$OCF_3$,
(b) a straight-chain or branched-chain alkyl group (with or without an asymmetric carbon atom) having from 1 to 20 carbon atoms, in which
b1) one or more non-adjacent and non-terminal —$CH_2$— groups may be replaced by —O—, —S—, —CO—, —CO—O—, —O—CO—, —O—CO—O— or —Si($CH_3$)$_2$— and/or
b2) one or more —$CH_2$— groups may be replaced by —CH=CH—, —C≡C—, 1,4-cyclohexylene, 1,4-phenylene, cyclopropane-1,2-diyl or 1,3-cyclopentylene and/or
b3) one or more hydrogen atoms of the alkyl group may be substituted by F and/or Cl and/or
b4) the terminal $CH_3$-group may be replaced by any one of the following chiral groups (optically active or racemic):

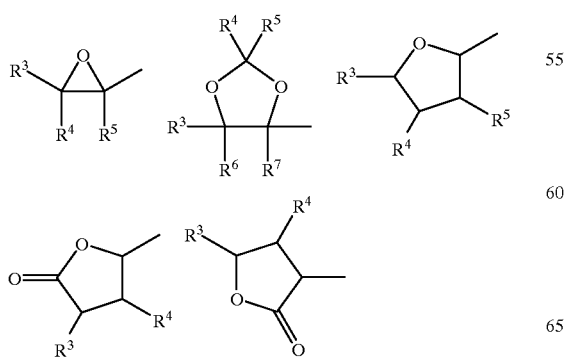

-continued

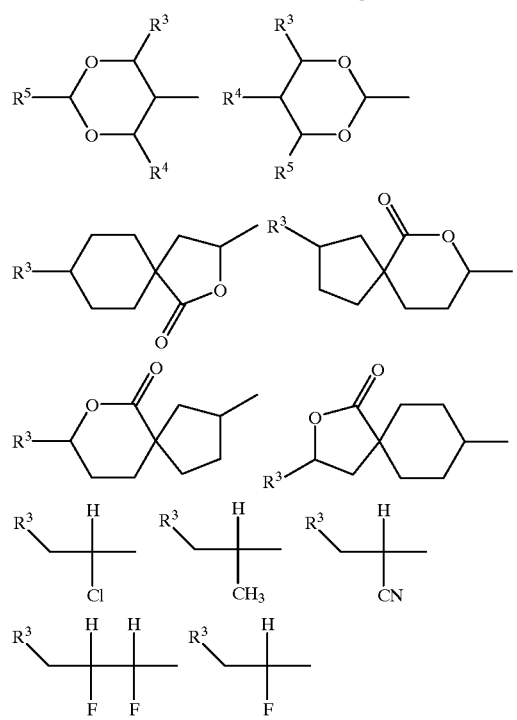

with the proviso that only one of $R^1$, $R^2$ can be a hydrogen atom, —F, —Cl, —CN, —$CF_3$ or —$OCF_3$;

$R^3$, $R^4$, $R^5$, $R^6$, $R^7$, independently of one another, are
a) a hydrogen atom,
b) a straight-chain or branched-chain alkyl group (with or without an asymmetric carbon atom) having from 1 to 16 carbon atoms, where
b1) one or more non-adjacent and non-terminal —$CH_2$— groups may be replaced by —O— and/or
b2) one or two —$CH_2$— groups may be replaced by —CH=CH— and/or
b3) one or more hydrogen atoms of the alkyl group may be substituted by F or Cl,
c) $R^4$ and $R^5$ may also together be —($CH_2$)$_4$— or —($CH_2$)$_5$— if they are bonded to an oxirane, dioxolane, tetrahydrofuran, tetrahydropyrane, butyrolactone or valerolactone system;

$M^1$, $M^2$, $M^3$, $M^4$, independently of one another, are —CO—O—, —O—CO—, —$CH_2$—O—, —O—$CH_2$—, —$CH_2$—$CH_2$—, —CH=CH—, —C≡C—, —$CH_2$—$CH_2$—CO—O—, —O—CO—$CH_2$—$CH_2$— or a single bond;

$A^1$, $A^2$, $A^3$, $A^4$, independently of one another, are 1,4-phenylene, in which one or more H atoms may be replaced by F, Cl and/or CN, pyridine-2,5-diyl, in which one H atom may be replaced by F, pyrimidine-2,5-diyl, pyrazine-2,5-diyl, in which one H atom may be replaced by F, pyridazin-3,6-diyl, in which one H atom may be replaced by F, 1,4-cyclohexylene in which one or two hydrogen atoms may be substituted by CN and/or F and/or $CH_3$, naphthalene-2,6-diyl, Cl and/or CN, thiophene-2,5-diyl, [1,3,4]-thiadiazole-2,5-diyl, [1,3]-thiazole-2,4-diyl, [1,3]-thiazole-2,5-diyl or 1,3-dioxane-2,5-diyl;

a, b, c, d are 0 or 1 with the proviso, that compounds of the formula (III) may not contain more than four five- or six-membered ring systems;

D. phenylene derivatives of the formula (IV),

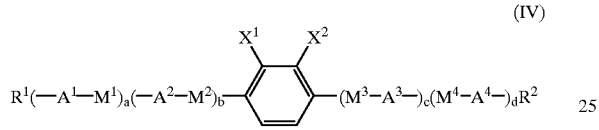

(IV)

in which the symbols and indices have the following meanings:

$R^1$ and $R^2$, independently of one another, are (a) a hydrogen atom, —F, —Cl, —CN, —$CF_3$ or —$OCF_3$, (b) a straight-chain or branched-chain alkyl group (with or without an asymmetric carbon atom) having from 1 to 20 carbon atoms, in which b1) one or more non-adjacent and non-terminal —$CH_2$— groups may be replaced by —O—, —S—, —CO—, —CO—O—, —O—CO—, —O—CO—O— or —Si$(CH_3)_2$— and/or b2) one or more —$CH_2$— groups may be replaced by —CH=CH—, —C≡C—, 1,4-cyclohexylene, 1,4-phenylene, cyclopropane-1,2-diyl or 1,3-cyclopentylene and/or b3) one or more hydrogen atoms of the alkyl group may be substituted by F and/or Cl and/or b4) the terminal $CH_3$-group may be replaced by any one of the following chiral groups (optically active or racemic):

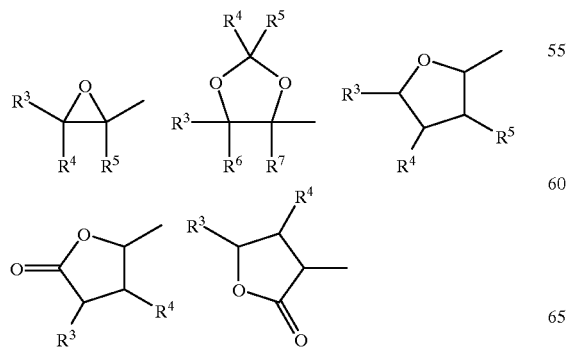

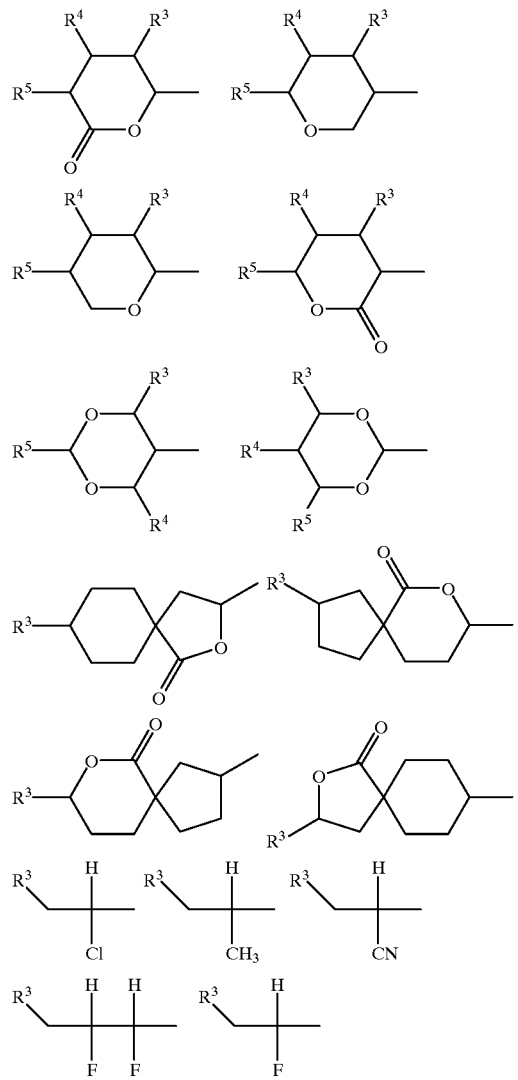

with the proviso that only one of $R^1$, $R^2$ can be a hydrogen atom, —F, —Cl, —CN, —$CF_3$ or —$OCF_3$;

$R^3$, $R^4$, $R^5$, $R^6$, $R^7$, independently of one another, are a) a hydrogen atom, b) a straight-chain or branched-chain alkyl group (with or without asymmetric carbon atoms) having from 1 to 16 carbon atoms, where b1) one or more non-adjacent and non-terminal —$CH_2$— groups may be replaced by —O— and/or b2) one or two —$CH_2$— groups may be replaced by —CH=CH— and/or b3) one or more hydrogen atoms of the alkyl group may be substituted by F or Cl, c) $R^4$ and $R^5$ may also together be —$(CH_2)_4$— or —$(CH_2)_5$— if they are bonded to an oxirane, dioxolane, tetrahydrofuran, tetrahydropyrane, butyrolactone or valerolactone system;

$X^1$ and $X^2$, independently of one another, are hydrogen, F, Cl, $CF_3$ or CN, with the proviso that $X^1$ and $X^2$ are not simultaneously hydrogen;

$M^1$, $M^2$, $M^3$, $M^4$, independently of one another, are —CO—O—, —O—CO—, —$CH_2$—O—, —O—$CH_2$—, —$CH_2$—$CH_2$—, —CH=CH—, —C≡C—, —CH$_2$—CH$_2$—CO—O—, —O—CO—CH$_2$—CH$_2$— or a single bond;

A$^1$, A$^2$, A$^3$, A$^4$, independently of one another, are
1,4-phenylene, in which one or more H atoms may be replaced by F, Cl and/or CN, pyridine-2,5-diyl, in which one H atom may be replaced by F, pyrimidine-2,5-diyl, pyrazine-2,5-diyl, in which one H atom may be replaced by F, pyridazin-3,6-diyl, in which one H atom may be replaced by F, 1,4-cyclohexylene in which one or two hydrogen atoms may be substituted by CN and/or F and/or CH$_3$, naphthalene-2,6-diyl, 1,2,3,4-tetrahydronapthalene-2,6-diyl, thiophene-2,5-diyl, [1,3,4]-thiadiazole-2,5-diyl, [1,3]-thiazole-2,4-diyl, [1,3]-thiazole-2,5-diyl or 1,3-dioxane-2,5-diyl;

a, b, c, d are 0 or 1 with the proviso, that compounds of the formula (IV) may not contain more than four five- or six-membered ring systems;

E. meta-substituted aromatic compounds of the formula (V):

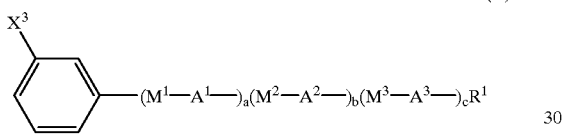

(V)

wherein the symbols and indices have the following meanings:

X$^3$ is
(a) —F, —Cl, —Br, —CN, —CF$_3$ or —OCF$_3$,
(b) a straight-chain or branched-chain alkyl group (with or without an asymmetric carbon atom) having from 1 to 12 carbon atoms, in which
 b1) one or two non-adjacent and non-terminal —CH$_2$— groups may be replaced by —O—, —S—, —CO—, —CO—O— or —O—CO— and/or
 b2) one or more hydrogen atoms of the alkyl group may be substituted by F and/or Cl and/or CN;

R$^1$ is
(a) a hydrogen atom, —F, —Cl, —CN, —CF$_3$ or —OCF$_3$,
(b) a straight-chain or branched-chain alkyl group (with or without an asymmetric carbon atom) having from 1 to 20 carbon atoms, in which
 b1) one or more non-adjacent and non-terminal —CH$_2$— groups may be replaced by —O—, —S—, —CO—, —CO—O—, —O—CO—, —O—CO—O— or —Si(CH$_3$)$_2$— and/or
 b2) one or more —CH$_2$— groups may be replaced by —CH=CH—, —C≡C—, 1,4-cyclohexylene, 1,4-phenylene, cyclopropane-1,2-diyl or 1,3-cyclopentylene and/or
 b3) one or more hydrogen atoms of the alkyl group may be substituted by F and/or Cl and/or
 b4) the terminal CH$_3$-group may be replaced by any one of the following chiral groups (optically active or racemic):

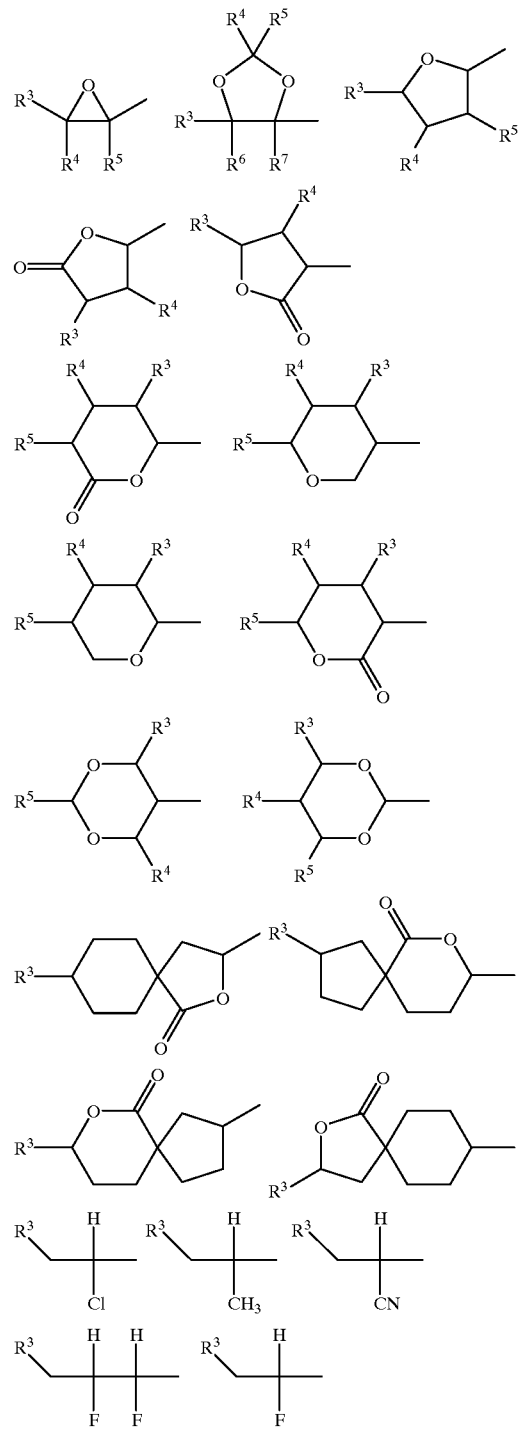

with the proviso that R$^1$ can not be a hydrogen atom, —F, —Cl, —CN, —CF$_3$ or —OCF$_3$ if X$^3$ is —F, —Cl, —Br, —CN, —CF$_3$ or —OCF$_3$;

R$^3$, R$^4$, R$^5$, R$^6$, R$^7$, independently of one another, are
a) a hydrogen atom,
b) a straight-chain or branched-chain alkyl group (with or without an asymmetric carbon atom) having from 1 to 16 carbon atoms, where
 b1) one or more non-adjacent and non-terminal —CH$_2$— groups may be replaced by —O— and/or b2) one or two —CH$_2$— groups may be replaced by —CH=CH— and/or b3) one or more hydrogen atoms of the alkyl group may be substituted by F or Cl, c) R$^4$ and R$^5$ may also together be —(CH$_2$)$_4$— or —(CH$_2$)$_5$— if they are bonded to an oxirane, dioxolane, tetrahydrofuran, tetrahydropyrane, butyrolactone or valerolactone system;

M$^1$, M$^2$, M$^3$, independently of one another, are —CO—O—, —O—CO—, —CH$_2$—O—, —O—CH$_2$—, —CH$_2$—CH$_2$—, —CH=CH—, —C≡C—, —CH$_2$—CH$_2$—CO—O—, —O—CO—CH$_2$—CH$_2$— or a single bond;

A$^1$, A$^2$, A$^3$, independently of one another, are 1,4-phenylene, in which one or more H atoms may be replaced by F, Cl and/or CN, pyridine-2,5-diyl, in which one H atom may be replaced by F, pyrimidine-2,5-diyl, pyrazine-2,5-diyl, in which one H atom may be replaced by F, pyridazin-3,6-diyl, in which one H atom may be replaced by F, 1,4-cyclohexylene in which one or two hydrogen atoms may be substituted by CN and/or F and/or CH$_3$, naphthalene-2,6-diyl in which one or more H atoms may be replaced by F, Cl and/or CN, thiophene-2,5-diyl, [1,3,4]-thiadiazole-2,5-diyl, [1,3]-thiazole-2,4-diyl, [1,3]-thiazole-2,5-diyl or 1,3-dioxane-2,5-diyl;

a, b, c are 0 or 1 with the proviso, that compounds of the formula (V) may not contain more than four five- or six-membered ring systems;

F. (1,3,4)-thiadiazoles of the formula (VI):

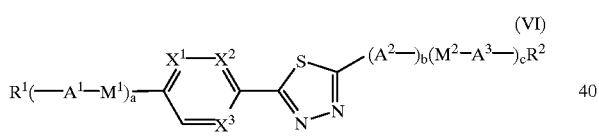

(VI)

wherein the symbols and indices have the following meanings:

R$^1$ and R$^2$, independently of one another, are (a) a hydrogen atom, —F, —Cl, —CN, —CF$_3$ or —OCF$_3$, (b) a straight-chain or branched-chain alkyl group (with or without an asymmetric carbon atom) having from 1 to 20 carbon atoms, in which b1) one or more non-adjacent and non-terminal —CH$_2$— groups may be replaced by —O—, —S—, —CO—, —CO—O—, —O—CO—, —O—CO—O— or —Si(CH$_3$)$_2$— and/or b2) one or more —CH$_2$— groups may be replaced by —CH=CH—, —C≡C—, 1,4-cyclohexylene, 1,4-phenylene, cyclopropane-1,2-diyl or 1,3-cyclopentylene and/or b3) one or more hydrogen atoms of the alkyl group may be substituted by F and/or Cl and/or b4) the terminal CH$_3$-group may be replaced by any one of the following chiral groups (optically active or racemic):

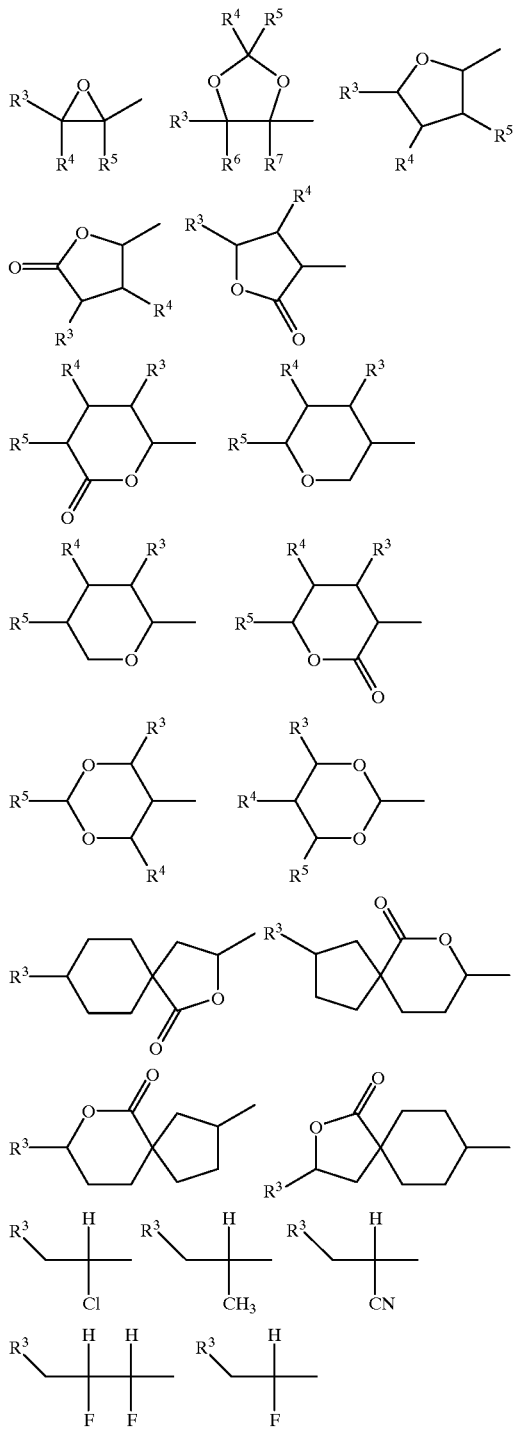

with the proviso that only one of R$^1$, R$^2$ can be a hydrogen atom, —F, —Cl, —CN, —CF$_3$ or —OCF$_3$;

R$^3$, R$^4$, R$^5$, R$^6$, R$^7$, independently of one another, are a) a hydrogen atom, b) a straight-chain or branched-chain alkyl group (with or without an asymmetric carbon atom) having from 1 to 16 carbon atoms, where b1) one or more non-adjacent and non-terminal —CH$_2$— groups may be replaced by —O— and/or b2) one or two —CH$_2$— groups may be replaced by —CH=CH— and/or b3) one or more hydrogen atoms of the alkyl group may be substituted by F or Cl, c) R$^4$ and R$^5$ may also together be —(CH$_2$)$_4$— or —(CH$_2$)$_5$— if they are bonded to an oxirane, dioxolane, tetrahydrofuran, tetrahydropyrane, butyrolactone or valerolactone system;

X$^1$, X$^2$, X$^3$, independently of one another, are —CF—, —N— or —CH—;

M$^1$, M$^2$, independently of one another, are —CO—O—, —O—CO—, —CH$_2$—O—, —O—CH$_2$—, —CH$_2$—CH$_2$—, —CH=CH—, —C≡C—, —CH$_2$—CH$_2$—CO—O—, —O—CO—CH$_2$—CH$_2$— or a single bond;

A$^1$, A$^2$, A$^3$, independently of one another, are 1,4-phenylene, in which one or more H atoms may be replaced by F, Cl and/or CN, pyridine-2,5-diyl, in which one H atom may be replaced by F, pyrimidine-2,5-diyl, pyrazine-2,5-diyl, in which one H atom may be replaced by F, pyridazin-3,6-diyl, in which one H atom may be replaced by F, 1,4-cyclohexylene in which one or two hydrogen atoms may be substituted by CN and/or F and/or CH$_3$, naphthalene-2,6-diyl, thiophene-2,5-diyl, [1,3,4]-thiadiazole-2,5-diyl, [1,3]-thiazole-2,4-diyl, [1,3]-thiazole-2,5-diyl or 1,3-dioxane-2,5-diyl;

a, b, c are 0 or 1 with the proviso, that compounds of the formula (VI) may not contain more than four five- or six-membered ring systems;

G. 4-cyanocyclohexyls of the formula (VII):

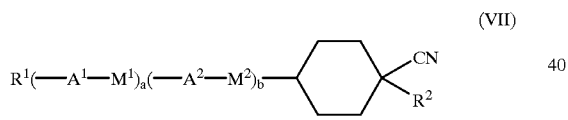
(VII)

wherein the symbols and indices have the following meanings:

R$^1$ is (a) a hydrogen atom, —F, —Cl, —CN, —CF$_3$ or —OCF$_3$, (b) a straight-chain or branched-chain alkyl group (with or without an asymmetric carbon atom) having from 1 to 20 carbon atoms, in which b1) one or more non-adjacent and non-terminal —CH$_2$— groups may be replaced by —O—, —S—, —CO—, —CO—O—, —O—CO—, —O—CO—O— or —Si(CH$_3$)$_2$— and/or b2) one or more —CH$_2$— groups may be replaced by —CH=CH—, —C≡C—, 1,4-cyclohexylene, 1,4-phenylene, cyclopropane-1,2-diyl or 1,3-cyclopentylene and/or b3) one or more hydrogen atoms of the alkyl group may be substituted by F and/or Cl and/or b4) the terminal CH$_3$-group may be replaced by any one of the following chiral groups (optically active or racemic):

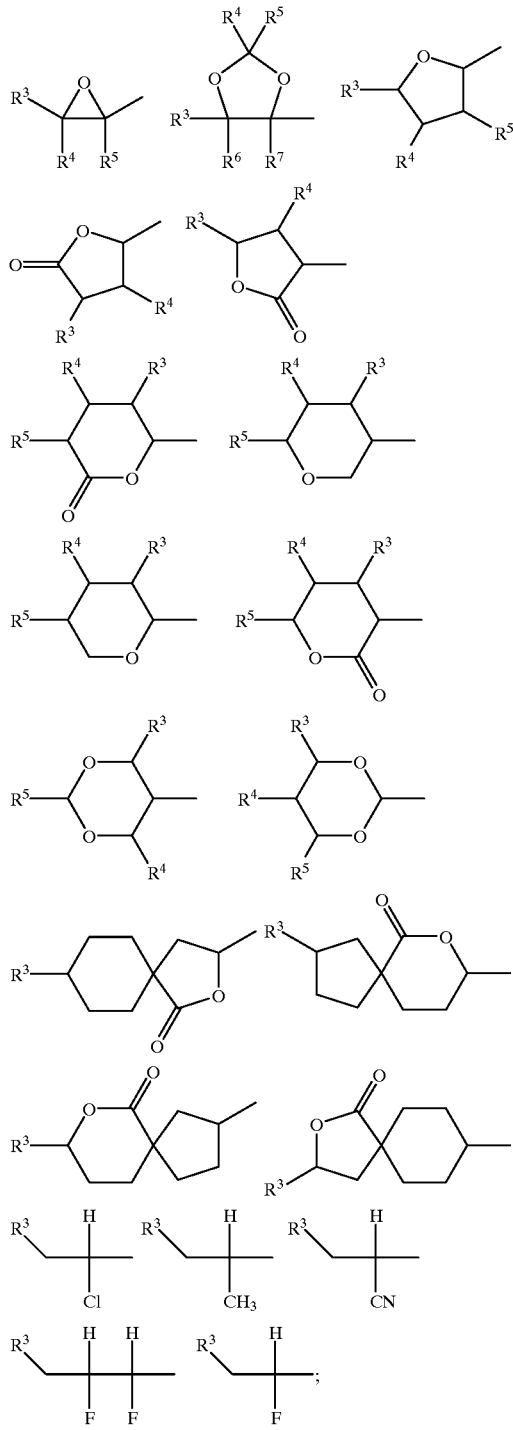

R$^2$ is (a) a straight-chain or branched-chain alkyl group (with or without an asymmetric carbon atom), having from 1 to 16 carbon atoms, in which a1) one or two non-adjacent and non-terminal —CH$_2$— groups may be replaced by —O—, —S—, —CO—, —CO—O—, —O—CO— or —Si(CH$_3$)$_2$— and/or a2) one or two —CH$_2$— groups may be replaced by —CH=CH—, —C≡C— and/or a3) one or more hydrogen atoms of the alkyl group may be substituted by F and/or Cl and/or CN and/or $CF_3$;

$R^3$, $R^4$, $R^5$, $R^6$, $R^7$, independently of one another, are
  a) a hydrogen atom,
  b) a straight-chain or branched-chain alkyl group (with or without an asymmetric carbon atom) having from 1 to 16 carbon atoms, where
    b1) one or more non-adjacent and non-terminal —$CH_2$— groups may be replaced by —O— and/or
    b2) one or two —$CH_2$— groups may be replaced by —CH=CH— and/or
    b3) one or more hydrogen atoms of the alkyl group may be substituted by F or Cl,
  c) $R^4$ and $R^5$ may also together be —$(CH_2)_4$— or —$(CH_2)_5$— if they are bonded to an oxirane, dioxolane, tetrahydrofuran, tetrahydropyrane, butyrolactone or valerolactone system;

$M^1$, $M^2$, independently of one another, are —CO—O—, —O—CO—, —$CH_2$—O—, —O—$CH_2$—, —$CH_2$—$CH_2$—, —CH=CH—, —C≡C—, —$CH_2$—$CH_2$—CO—O—, —O—CO—$CH_2$—$CH_2$— or a single bond;

$A^1$, $A^2$, independently of one another, are 1,4-phenylene, in which one or more H atoms may be replaced by F, Cl and/or CN, pyridine-2,5-diyl, in which one H atom may be replaced by F, pyrimidine-2,5-diyl, pyrazine-2,5-diyl, in which one H atom may be replaced by F, pyridazin-3,6-diyl, in which one H atom may be replaced by F, 1,4-cyclohexylene in which one or two hydrogen atoms may be substituted by CN and/or F and/or $CH_3$, naphthalene-2,6-diyl, thiophene-2,5-diyl, [1,3,4]-thiadiazole-2,5-diyl, [1,3]-thiazole-2,4-diyl, [1,3]-thiazole-2,5-diyl or 1,3-dioxane-2,5-diyl;

a, b are 0 or 1 with the proviso, that compounds of the formula (VII) may not contain more than four five- or six-membered ring systems.

2. The mixture as claimed in claim 1 comprising 2 to 35 compounds of groups A to G.

3. The mixture as claimed in claim 1, comprising at least 5% by weight of compounds of group A to G.

4. The mixture as claimed in claim 1, comprising a combination of compounds selected from each group:

| a) | A + B | b) | A + C | c) | A + D |
|----|-------|----|-------|----|-------|
| d) | A + E | e) | A + F | f) | A + G. |

5. The mixture as claimed in claim 1, comprising a combination of compounds selected from each group:

| a) | A + B + C | b) | A + B + D | c) | A + B + E | d) | A + B + F |
|----|-----------|----|-----------|----|-----------|----|-----------|
| e) | A + B + G | f) | A + C + D | g) | A + C + E | h) | A + C + F |
| i) | A + C + G | j) | A + D + E | k) | A + D + F | l) | A + D + G |
| m) | A + E + F | n) | A + E + G | o) | A + F + G. | | |

6. The mixture as claimed in claim 1, comprising a combination of compounds from each group:

| a) | A + B + C + D | b) | A + B + C + E | c) | A + B + C + F |
|----|---------------|----|---------------|----|---------------|
| d) | A + B + C + G | e) | A + B + D + E | f) | A + B + D + F |
| g) | A + B + D + G | h) | A + B + E + F | i) | A + B + E + G |
| j) | A + B + F + G | k) | A + C + D + E | l) | A + C + D + F |
| m) | A + C + D + G | n) | A + C + E + F | o) | A + C + E + G |
| p) | A + C + F + G | q) | A + D + E + F | r) | A + D + E + G |
| s) | A + D + F + G | t) | A + E + F + G. | | |

7. A ferroelectric liquid crystal display device comprising a mixture as claimed in claim 1.

8. The device as claimed in claim 7, which is operated in the $\tau V_{min}$-mode.

* * * * *